United States Patent [19]

Law

[11] 4,107,712
[45] Aug. 15, 1978

[54] CAMERA FOR TAKING THREE DIMENSIONAL PHOTOGRAPHS HAVING SCREEN MOVING MEANS

[76] Inventor: Chi Y. Law, 7845 Cambie St., Vancouver, British Columbia, Canada, V6P 3J1

[21] Appl. No.: 765,229

[22] Filed: Feb. 3, 1977

Related U.S. Application Data

[63] Continuation-in-part of Ser. No. 643,600, Dec. 22, 1975, abandoned.

[30] Foreign Application Priority Data

Dec. 25, 1974 [JP] Japan .................................. 49/148202

[51] Int. Cl.² ............................................ G03B 35/08
[52] U.S. Cl. ....................................... 354/115; 352/64; 353/10; 354/125; 355/22
[58] Field of Search ................ 354/112, 115, 120, 123, 354/125; 352/53, 64, 62, 86, 58, 67; 353/10; 355/22

[56] References Cited

U.S. PATENT DOCUMENTS

| | | | |
|---|---|---|---|
| 3,506,316 | 3/1970 | Takano et al. | 354/112 |
| 3,521,947 | 7/1970 | Jones | 352/53 |
| 3,528,736 | 9/1970 | Jones | 355/22 |
| 3,590,709 | 7/1971 | Mikami | 354/125 |
| 3,596,584 | 8/1971 | Jones | 354/112 |
| 3,621,589 | 11/1971 | Jones et al. | 35/2 |
| 3,678,833 | 7/1972 | Leach | 354/103 |
| 3,683,772 | 8/1972 | Jones | 354/112 |
| 3,685,413 | 8/1972 | Matsunaga et al. | 354/112 |
| 3,731,606 | 5/1973 | Geoffray | 354/112 X |

*Primary Examiner*—Richard A. Wintercorn
*Attorney, Agent, or Firm*—Christie, Parker & Hale

[57] ABSTRACT

A photographic camera for three dimensional photography. The photosensitive material is positioned at a fixed location during the exposure cycle of the camera. Optics projects the light from a scene to be photographed along an optical path onto the located photosensitive material. A lenticular screen is positioned in the optical path and adjacent the location for photosensitive material. The path of light from the scene is blocked and an optical aperture is passed across the optical path for sequentially exposing the photosensitive material through the lenticular screen to the light rays from the scene. A lenticular screen is moved a predetermined distance along a path transverse to the path of the light simultaneously with the movement of the optical aperture. The arrangement for moving the lenticular screen comprises means for guiding the screen along said predetermined path and a pivoted member, a connection between the pivoted member, at a position displaced from the pivot thereof, and the screen. Also a rack is connected to the pivoted member and a pinion engages the rack. A motor rotatably drives the pinion to thereby move the rack and thereby pivot the pivoted member and move the screen along the predetermined path a precise predetermined amount corresponding to the driving movement of the motor.

14 Claims, 27 Drawing Figures

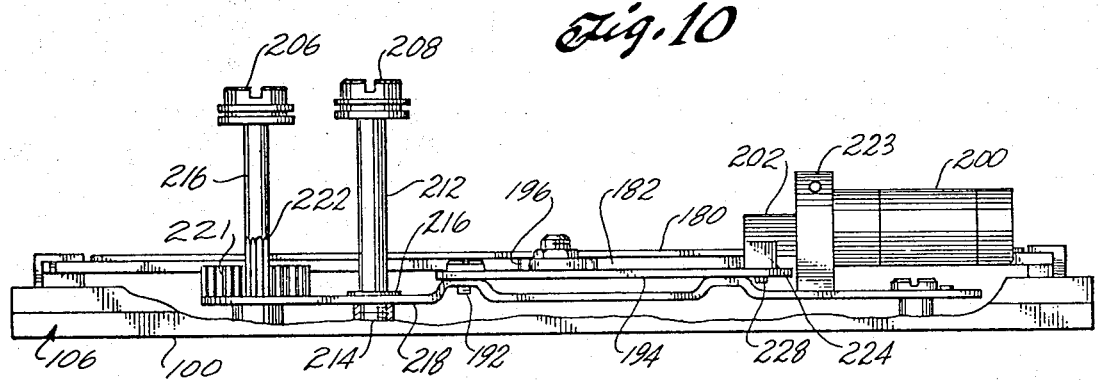
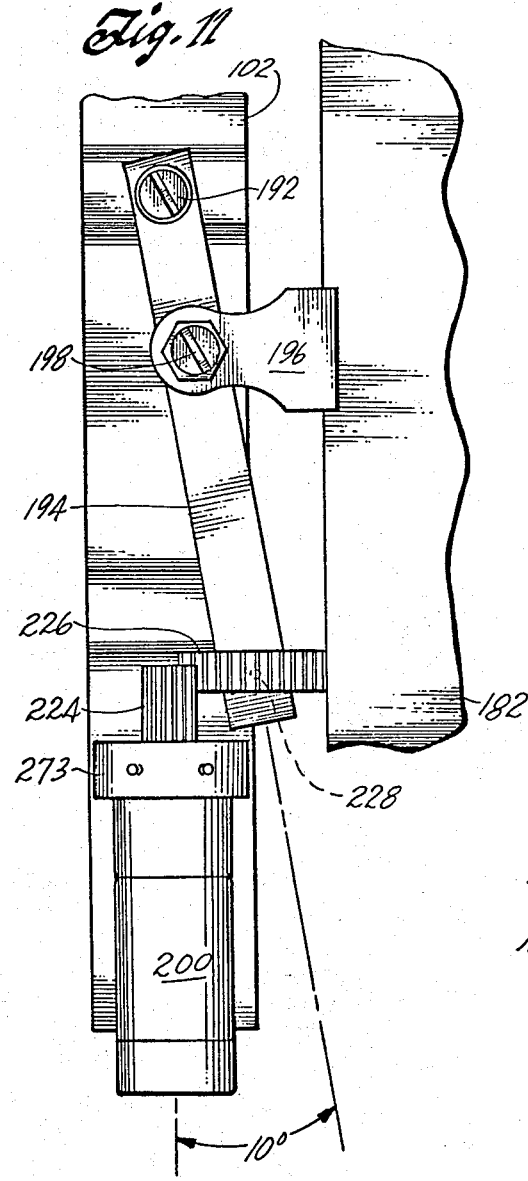
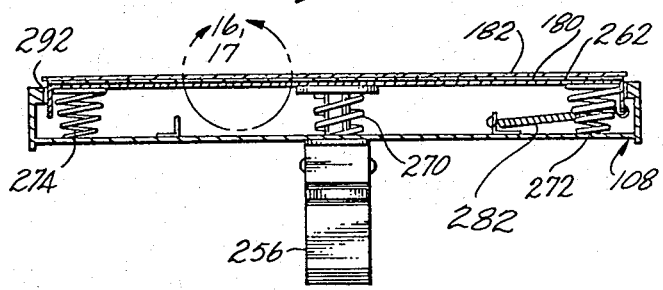
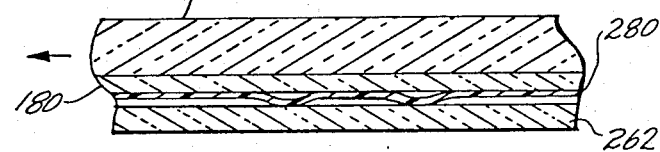
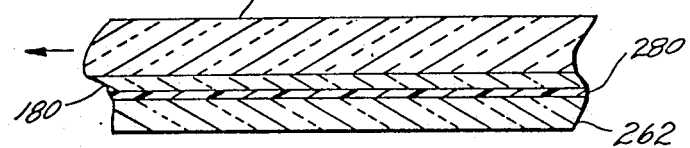

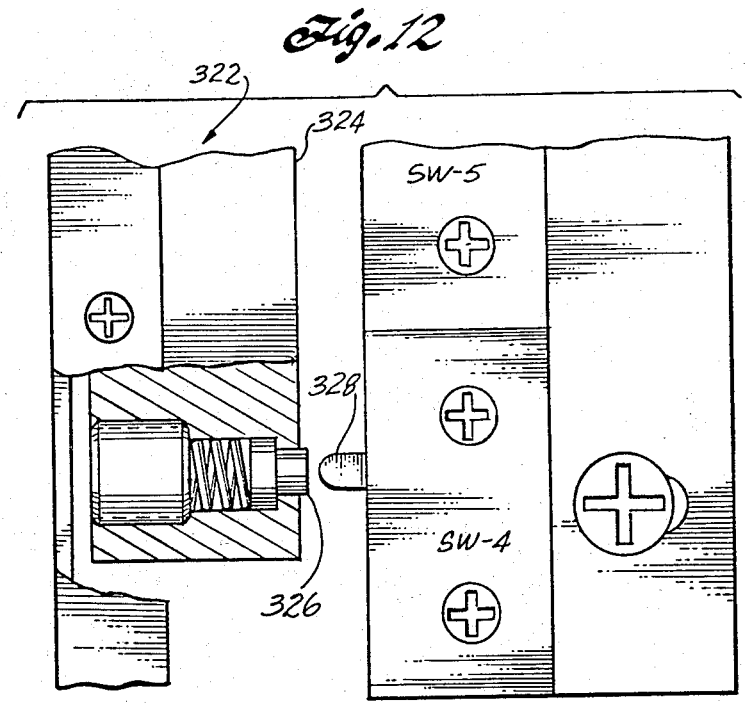
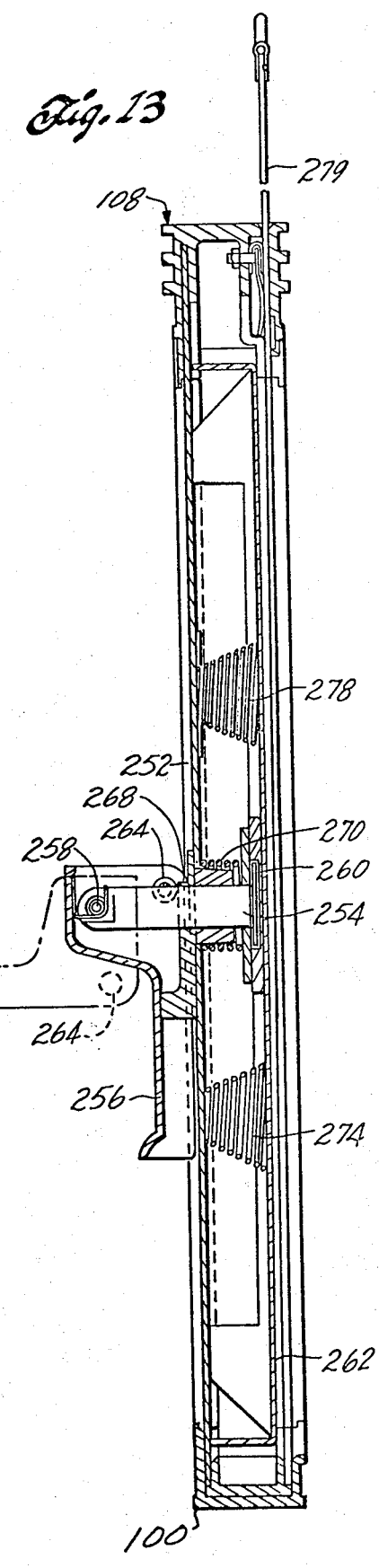
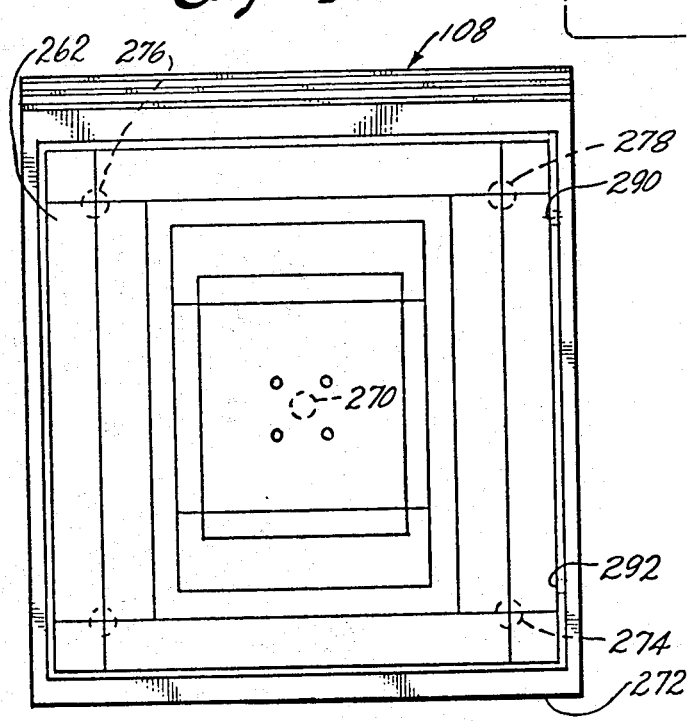

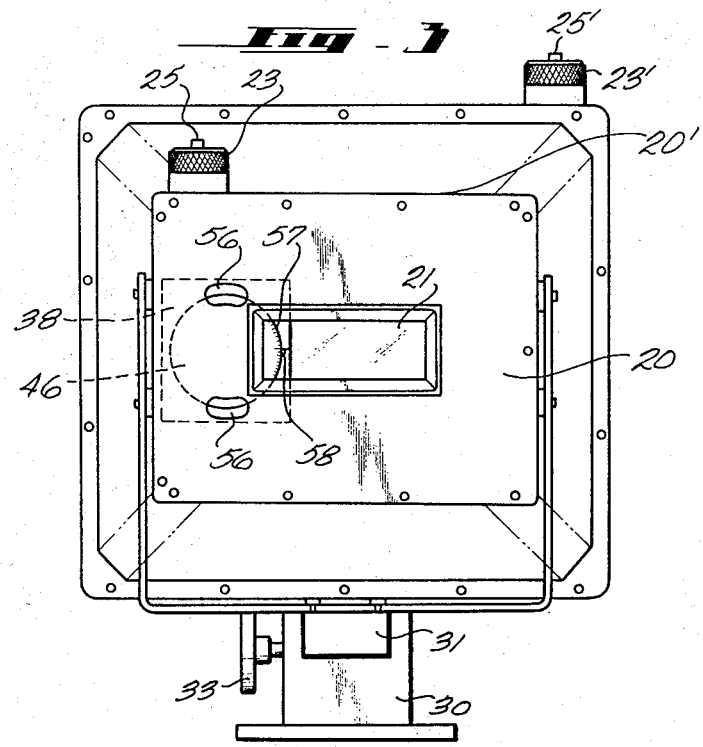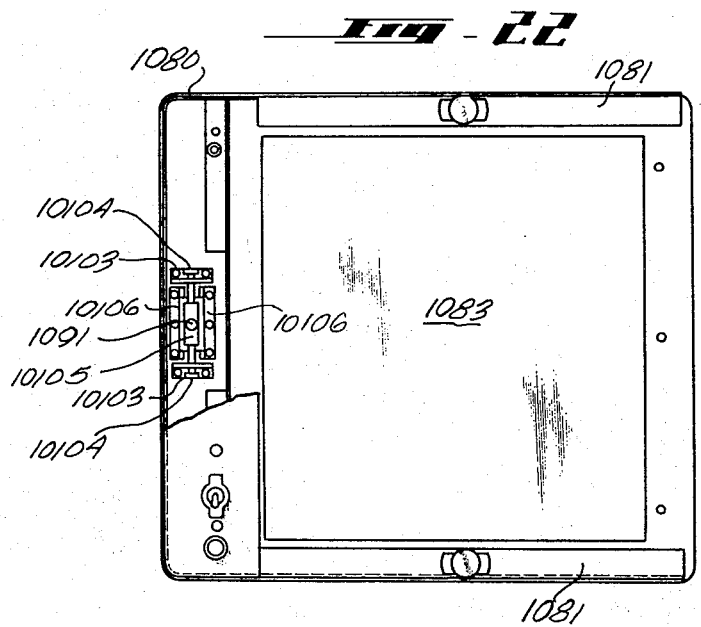

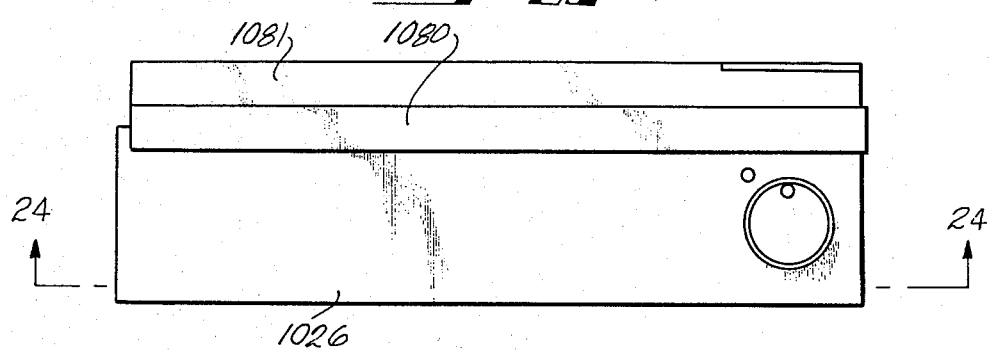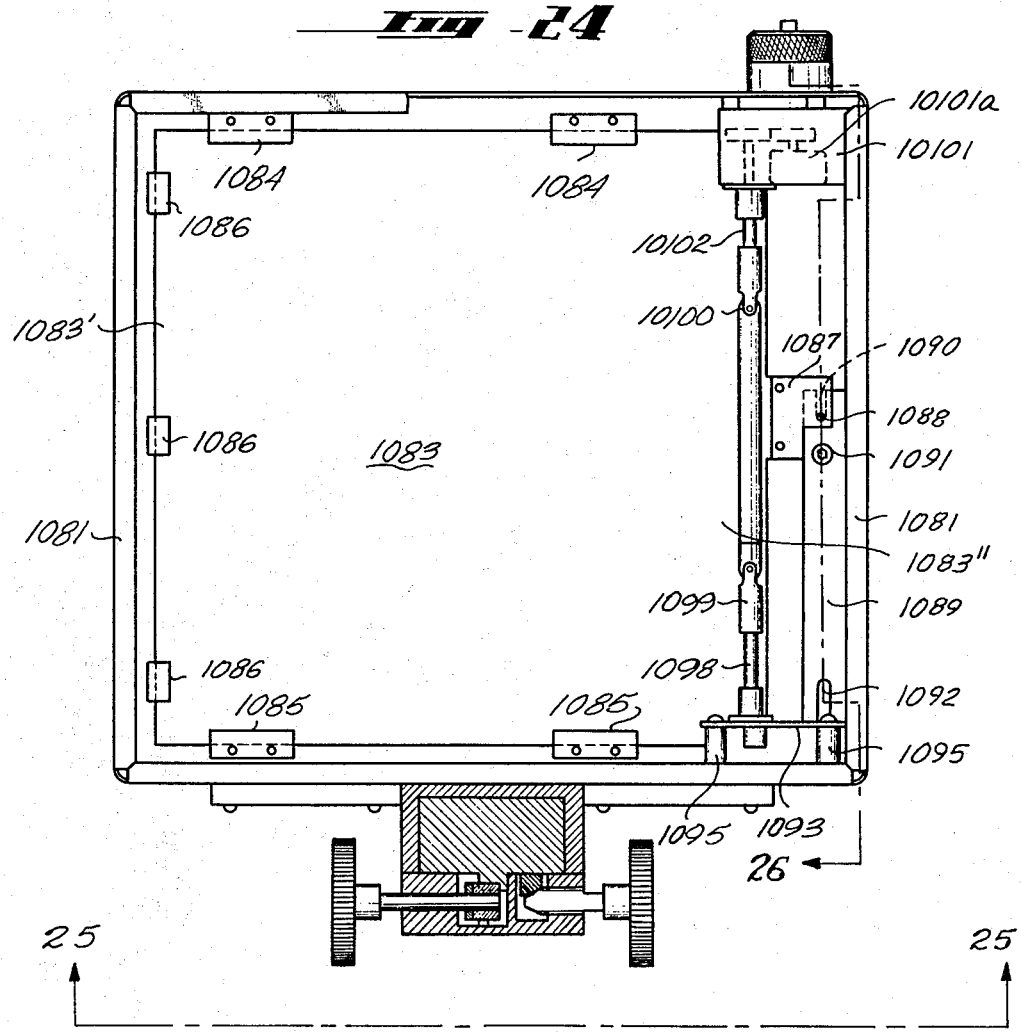

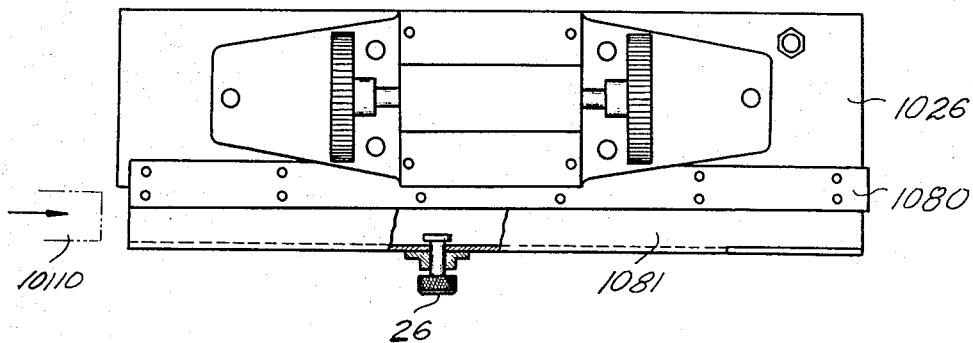
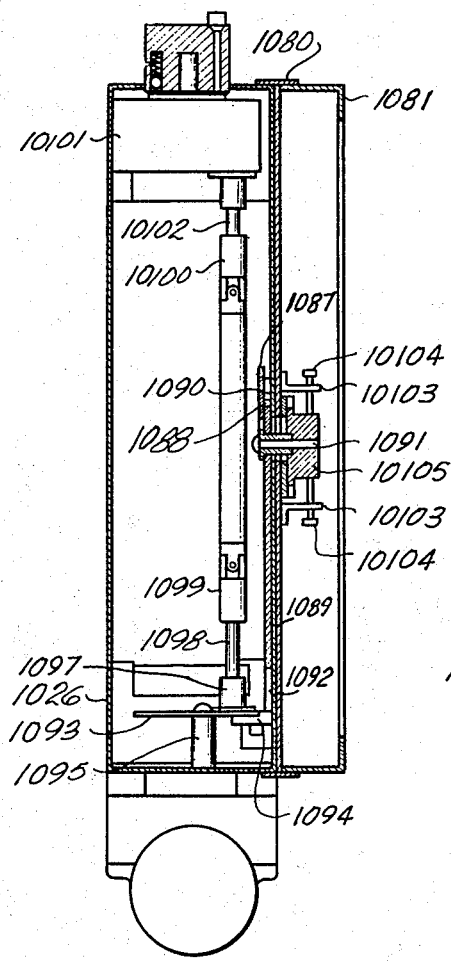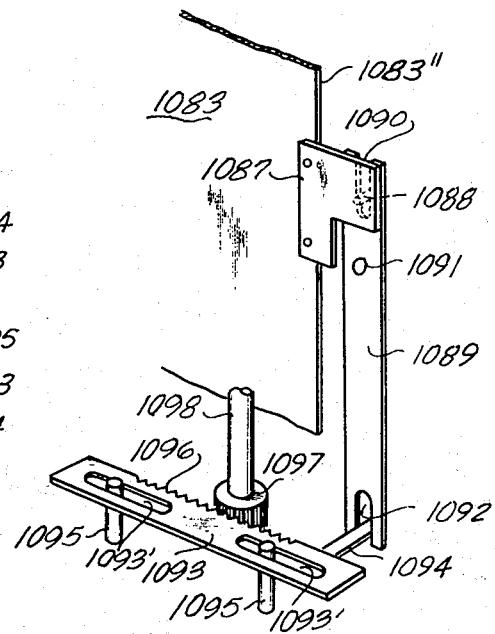

CAMERA FOR TAKING THREE DIMENSIONAL PHOTOGRAPHS HAVING SCREEN MOVING MEANS

CROSS REFERENCE TO RELATED APPLICATIONS

This application is a continuation-in-part of my earlier filed co-pending application U.S. Serial No. 643,600 filed Dec. 22, 1975, now abandoned which in turn claims priority of my Japanese application No. 1974-148202 filed Dec. 25, 1974.

CROSS REFERENCE TO RELATED APPLICATIONS

This application also has common subject matter to that contained in the patent applications filed on even date herewith in my name as follows:
U.S. Ser. No. 765,230 titled CAMERA FOR TAKING THREE DIMENSIONAL PHOTOGRAPHS
U.S. Ser. No. 765,232 titled THREE DIMENSIONAL CAMERA HAVING LENTICULAR SCREEN MOVING APPARATUS.
U.S. Ser. No. 765,228 titled THREE DIMENSION CAMER HAVING A FILM HOLDER.

BACKGROUND OF THE INVENTION

The present invention relates to photographic cameras for taking three dimensional photographs utilizing a lenticular screen.

A number of methods and apparatus have been devised and proposed for taking and viewing three dimensional photographic pictures. One prior art method and apparatus has two cameras photograph the left and right images of an object on film. The exposed film is developed and is then viewed through a device which allows the user to view the left image with the left eye and the right image with the right eye. Disadvantages with such an arrangement are that two cameras are required for taking the photograph and further, the three dimensional image cannot be viewed with the naked eye because some type of viewer, reflective plates or colored filters are required to avoid reversal of the left and right images.

Methods and apparatus have also been proposed for exposing film through a lenticular screen having very small diameter, semicircular and parallel lenticular elements. The exposed film is then viewed through a similar lenticular screen by the naked eye. Such methods and apparatus sequentially expose film through the lenticular screen.

One method and apparatus using a lenticular screen involves a camera which is positioned at a number of different angles about the object being photographed, and for each position exposing film through the lenticular screen while moving the lenticular screen.

Another method and apparatus using a lenticular screen eliminates the need for moving the camera and includes the combination of a lenticular screen positioned in contact with unexposed film, an objective for focussing an image of a scene to be photographed on the lenticular screen, and a shutter which is movable across the path for light rays from the objective for sequentially exposing the film. With the latter method and apparatus it has been proposed to move at least two of the elements including the objective lens, the lenticular screen, the shutter curtain and the film, during the exposure cycle. However, it has been found to be very difficult to control and obtain sharp three dimensional viewing images using such method and apparatus. As a result these methods have generally resulted in low quality three dimensional photographs and the method and apparatus have not met with any substantial degree of success.

One of the last mentioned method and apparatus involved a camera in which there is movement of the film and the shutter curtain relative to the lenticular screen during the exposure cycle. Relative movement between the film and lenticular screen is generally required by some precise amount. If the precise amount of relative movement is not achieved, the three dimensional quality of the photograph will be poor or the photographic image cannot be seen at all. Where the film is moved it is difficult to control the precise amount of movement of the film and it is difficult to maintain uniform contact between the film and the lenticular screen. In the camera where the film is moved the shutter curtain and film are moved in opposite directions and the film is moved a distance substantially equal to the width of two of the lenticular elements. This results in double exposures underneath the lenticular elements, further contributing to poor quality in the three dimensional photograph. Additionally, the resulting photograph contains reversed images under each lenticular element requiring that the images be reversed using a reversing process before the images can be viewed.

The reversing process creates serious problems which make it unsatisfactory and undesirable. Specifically, the exposed film obtained from the exposure cycle of the aforementioned camera is developed into a transparency. A reversing machine positions, in parallel layered relation, a lenticular screen adjacent to the transparency which is adjacent to a new unexposed film. The reversing machine moves the lenticular screen, the transparency, and the new unexposed film while exposing the new unexposed film to an exposure light through the lenticular screen and the transparency. A lenticular screen must be selected which has the same diameter lenticular elements as in the camera and the distance of movement must be selected to correspond to the movement of the lenticular screen in the camera. However, the angle of deflection of the objective lens system varies from camera to camera and as a result a different amount of movement is required in the reversing process for each different objective lens system and hence camera. As a result it becomes necessary to design a different reversing machine, or at least select the amount of movement during reversing, for each different camera. Neither of the aforementioned is practical.

Japanese patent application No. 1971-20693 (Official Gazette No. 1972-37637), filed by the present inventor, discloses a camera for taking three dimensional photographs utilizing a lenticular screen, having small diameter lenticular elements, closely placed adjacent the unexposed film in which the objective lens focusses an image from the scene to be photographed onto the lenticulated side of the lenticular screen. A shutter screen bearing a shutter aperture is moved across the optical path between the objective lens and the lenticular screen, while the lenticular screen moves a distance equal to one pitch of the lenticular screen. Significantly the shutter and lenticular screen are moved in the same direction relative to the film and as a result an unreversed three dimensional image is formed on the film.

Thus the film may be developed into a print and placed behind a lenticular screen for direct viewing without additional image reversing steps. However, it has been found that such method if practiced as taught will result in areas on the exposed film which are not exposed or are double exposed. Therefore when viewed through a lenticular screen after developing, the film will appear to have gaps or blank spaces or double exposures, resulting in an unattractive and undesirable photograph.

A significant problem exists with respect to three dimensional cameras utilizing a movable lenticular screen in that the amount of relative movement between the lenticular screen and the film is difficult to precisely control. Should the relative movement between the lenticular screen and the film be too much or too little, the gaps or double exposures mentioned above will be obtained. Accordingly, a need exists for an arrangement to precisely control the amount of relative movement between screen and film.

BRIEF DESCRIPTION OF THE INVENTION

Briefly, a photographic camera for three dimensional photography embodying the present invention includes means for positioning photosensitive material at a fixed location during an exposure cycle of the camera. Optics projects light from a scene to be photographed along an optical path onto the photosensitive material. A lenticular screen is positioned in the optical path and adjacent the location for the photosensitive material. The path of light from the scene is blocked and an optical aperture is passed across the optical path for sequentially exposing the photosensitive material through the lenticular screen to the light rays from the scene. The lenticular screen is moved relative to the photosensitive material a predetermined distance along a path transverse to the path of the light simultaneously with the movement of the optical aperture. The means for moving the lenticular screen comprises means for guiding said screen along said predetermined path and a pivoted member and the pivoted member is connected, at a position displaced from the pivot thereof, to the screen. A rack is connected to the pivoted member and a pinion engages the rack. A motor rotatably drives the pinion to thereby move the rack and thereby pivot the pivoted member anv move the screen along said predetermined path a precise predetermined amount corresponding to the driving movement of the motor.

BRIEF DESCRIPTION OF THE DRAWINGS

FIG. 10 is a side elevation view of the rear unit taken along the lines 10—10 of FIG. 9 with a portion of the housing broken away to reveal the parts hidden thereby;

FIG. 11 is a plan view of the lenticular screen adjustment mechanism after the pivoted member has been moved approximately 10°;

FIG. 12 is a view of the delay switch and a portion of the stop switch and the stop for the screen taken from within the circle 12 depicted in FIG. 9;

FIG. 13 is an enlarged cross-sectional view of the film holder in the rear unit taken along lines 13—13 of FIG. 8;

FIG. 14 is a plan view of the opposite side of the film holder from that depicted in FIG. 8; the side shown contains the pressure plate to which the photosentive material is attached for exposure;

FIG. 15 is a reduced cross-sectional view of the film holder depicted in FIG. 13 taken along lines 15—15 of FIG. 8, depicting a condition wherein the handle of the film holder has been rotated outwardly 90° with respect to that depicted in FIG. 13 and illustrating a sheet of unexposed photosensitive material sandwiched between the pressure plate of the film holder and the lenticular screen;

FIG. 16 is an enlarged cross-sectional representation of the pressure plate, a deformed sheet of photosensitive material, a lenticular screen, and glass taken from the circle 16 in FIG. 15; FIG. 16 represents the condition of the unexposed photosensitive material prior to the initial movement of the lenticular screen relative to the photosensitive material in the direction depicted by the arrow;

FIG. 17 is an enlarged cross-sectional representation of the pressure plate, unexposed sheet of photosensitive material, the lenticular screen, and the glass taken from the circle in FIG. 15 after the lenticular screen has been moved through its initial movement in the direction of the arrow to smooth out the photosensitive material;

FIG. 22 is a rear elevation view of an alternate rear unit for a camera embodying the present invention; the rear panel is partially broken away;

FIG. 23 is a top elevation view of the rear unit of FIG. 22;

FIG. 24 is a section view of the rear unit of FIG. 22 taken along the lines 24—24 of FIG. 23;

FIG. 25 is a bottom view of the rear unit of FIG. 22 taken along the lines 25—25 of FIG. 24 with a portion thereof broken away;

FIG. 26 is a vertical side section view taken along the lines 26—26 of FIG. 24; and FIG. 27 is a perspective view partially broken away showing a principal part of the lenticular screen driving mechanism in the rear unit of FIG. 22.

GENERAL DESCRIPTION

Figure 1:
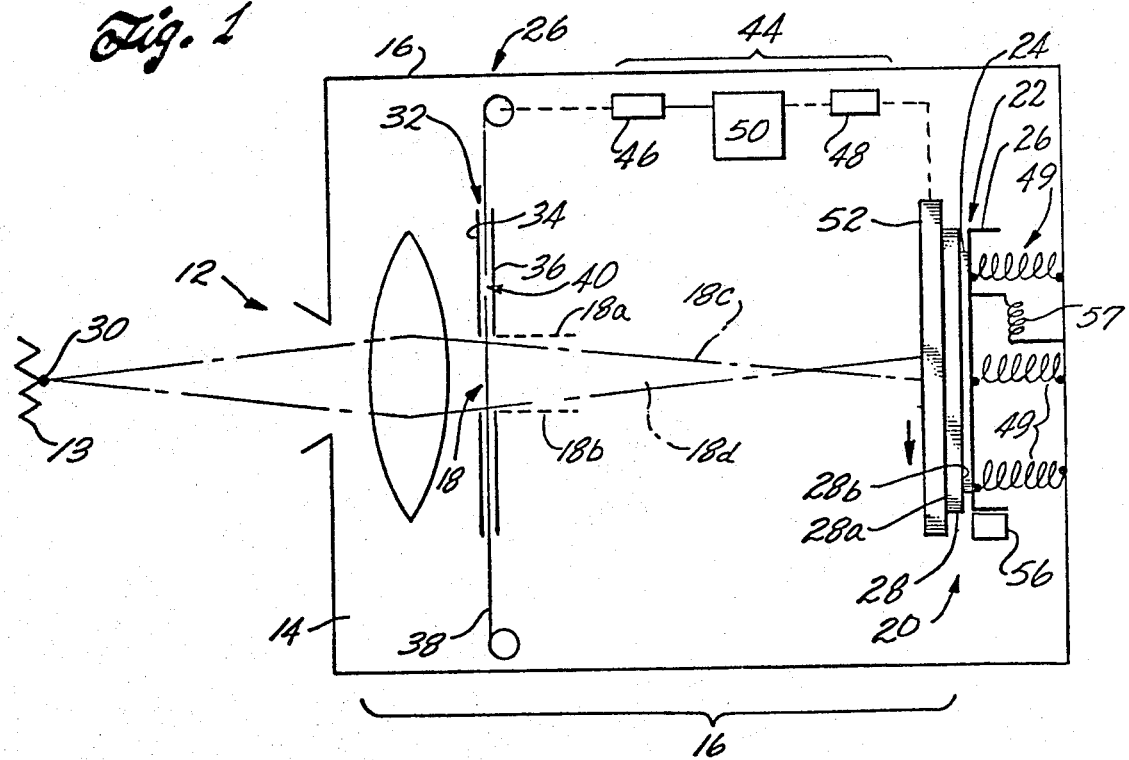
FIG. 1 is a schematic representation of a cross-section of a camera for taking three dimensional photographs, embodying the present invention.

Refer now to FIG. 1 which schematically illustrates an embodiment of the present invention. FIG. 1 discloses a photographic camera for taking three dimensional photographs. Included is a housing 10 which for purposes of description is substantially in the form of a parallelepiped. A rectangular shaped opening 12 admits light rays to the interior 14 of the camera housing from, for example, a scene 13.

Also in the optical system 16, means 22 is provided for immovably locating a sheet of photosensitive material 24 in communication with the interior of the housing at a location 20 during a time for exposure. The means 22 preferably includes a rectangular shaped pressure plate 26 and double backed tape (not shown) for attaching the photosensitive material 24 to the surface of a rectangular pressure plate.

An optical system 16 in the housing projects light rays, received through the opening 12, along a path 18. The light rays, received through the opening 12, are projected along such path to the location 20 for the photosensitive material where an image of the scene is focussed on a rectangular shaped lenticular screen 28 which is also a part of the optical system 16.

The optical path 18 has a first position 32 therealong extending from side 18a to side 18b of the optical path. To be explained in more detail, the position 32 is preferably where a shutter curtain is positioned and is moved across the light rays.

The lenticular screen 28 extends across the path 18 at a second position 20 farther along path 18 from the first position 32. Planar side 28a of the lenticular screen 28 has elongated lenticular elements extending perpendicular to the plane of FIG. 1. Each lenticular element, to be explained in more detail, is of the same width P, is parallel to each of the others and faces in the direction from which the light rays are being projected. The lenticular screen has an opposite side 28b positioned for contact with the photosensitive surface of the photosensitive material 24 when in the location 20.

The optical system 16 is characterized in that it changes, by a predetermined distance, which may be referred to by way of example as Y, on the photosensitive surface of the photosensitive material, the position of light rays which come from a common point, such as 30, on the scene and which extend along the first and second sides 18a and 18b of the path. Two such light rays are generally depicted by the broken lines 18c and 18d by way of example.

Means is provided at 32 for blocking the received light rays and includes, by way of example, a pair of fixed masks 34 and 36 having concentric rectangular shaped apertures, at the center of the optical path, and a conventional shutter screen 38 between the masks.

An aperture 40 in the screen 38 is movable across the path 18 at the first position 32 from the first side 18a to the second side 18b of the path for exposing the light rays sequentially to the photosensitive material, moving across the lenticular screen 28 in a direction which is normal to the elongation of the lenticular elements thereon. By way of example, the aperture 40 is moved from top to bottom in FIG. 1.

Means 44 is provided for so moving the aperture 40 substantially throughout the time for exposure of the photosensitive material 24 while simultaneously and synchronously moving the lenticular screen 28. The lenticular screen 28 is moved substantially throughout the entire time for exposure of the photosensitive material and in substantially the same direction as the light rays sequentially expose the photosensitive material 24. Significantly the distance by which the lenticular screen 28 is moved is substantially equal to the sum of the distances P + Y to thereby expose a continuous unreversed image of the scene on the photosensitive material. By way of example, the means for moving 44 includes a motor 46 for driving the shutter curtain 38 containing the aperture 40, a motor 48 for driving the lenticular screen 28, and an electrical control circuit 50 which simultaneously and synchronously moves the shutter curtain 38 and lenticular screen 28 so that the duration of time during which the aperture 40 passes light to the photosensitive material 24 and the time for the lenticular screen 28 to move exactly the distance P + Y are substantially equal. As a result an image is directly produced on the photosensitive material which, when viewed through a lenticular screen, appears to be three dimensional and significantly does not appear to have blank spaces, is not double exposed, and appears continuous when moving from one side to the other during viewing. It is quite important that the photosensitive material 24 be maintained in uniform contact with the lenticular screen 28 without wrinkles, bubbles, or other irregularities during the entire exposure time. Means is provided for forming the photosensitive material over its exposure surface in uniform contact with the adjacent side of the screen throughout the entire exposure time. Such means includes a planar pressure means such as pressure plate 26 and springs 49 which exert a substantially uniform pressure through the photosensitive material and against the lenticular screen 28 over the entire exposure surface of the photosensitive material 24. Also included is means for preliminarily moving the lenticular screen 28 sideways relative to the pressure plate 26, prior to the commencement of the exposure time. The preliminary movement is a distance which is sufficient to cause the photosensitive material to be smoothed out in uniform contact with the screen for exposure. The means for preliminarily moving the screen inclues, by way of example, motor 46 for moving the shutter and hence the aperture, motor 48 for moving a clear sheet of glass 52 to which the lenticular screen 28 is attached, and an electronic circuit 50 which initially energizes the motor 48, starting movement of the glass 52 and hence the lenticular screen, prior to the time it energizes the motor 46 to thereby commence the exposure time.

Preferably the pressure plate 26 is mounted for movement relative to the housing 10 in a direction toward and away from the photosensitive material 24. In this manner the pressure plate can be withdrawn in a direction away from the photosensitive material for removal of the photosensitive material and returned to the position where it sandwiches the photosensitive material against the lenticular screen 28. However, with such an arrangement, side movement of the pressure plate 26 must be completely eliminated in order to prevent even the slightest movement of the photosensitive material 24 along with the movement of the lenticular screen 28. To this end, means in the form of a stop 56 is provided for restraining movement of the pressure plate 26 in the direction of the movement of the lenticular screen 28 and a spring 57 urges the pressure plate 26 in the direction of and against the stop 56.

DETAILED DESCRIPTION

Figure 20:
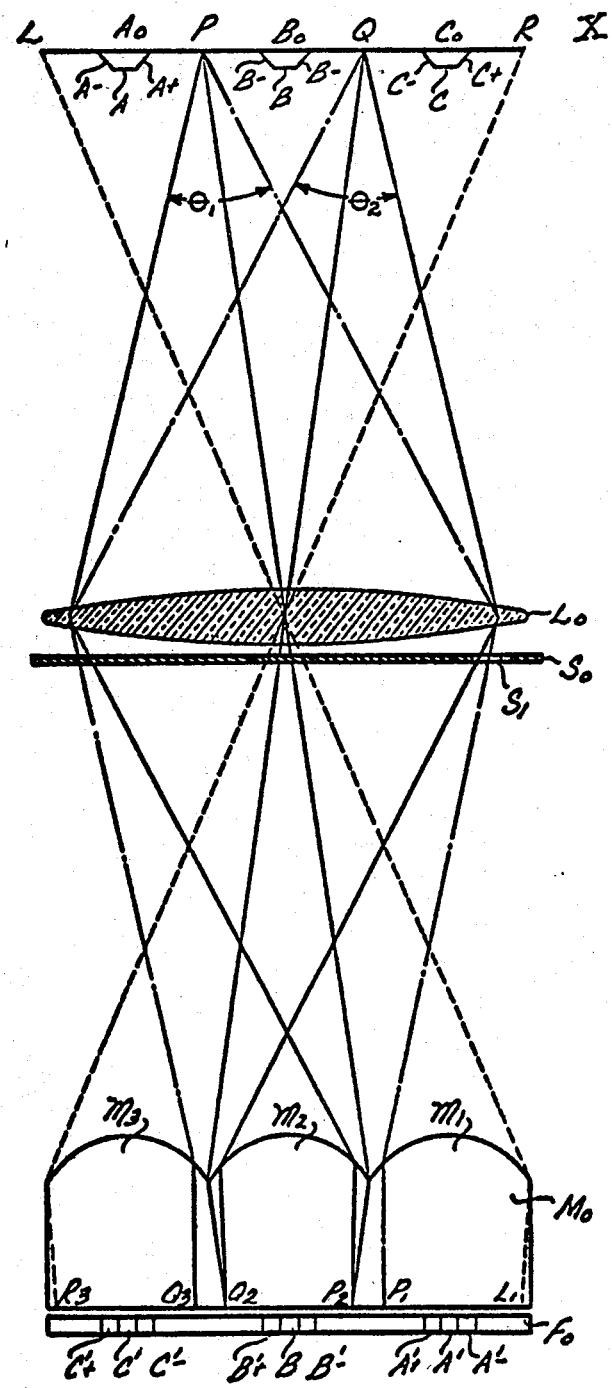
FIG. 20 is a schematic illustration of the optical system to aid in understanding the principles of forming the unreversed images under the lenticular elements.

Consider briefly the principles whereby the images are exposed on the photosensitive material, unreversed for direct viewing through a lenticular screen in three dimensional form. Refer now to FIG. 20.

The object L to be photographed is positioned at X. $L_0$ is an objective, $S_0$ is a shutter located behind the objective, and adapted to be opened and closed by movement in a direction transversely to the direction of the optical axis, $M_0$ is a lenticular screen, and $F_0$ is photosensitive material. The objective $L_0$ is preferably an objective for photographing which is cut along parallel planes extending in a direction parallel to the main optical axis of the objective. Correspondingly and preferably, the shutter $S_0$ is formed also with an opening $S_1$ which is elongated in a direction transversely of the cutting parallel planes of the objective $L_0$.

Lenticular screens as depicted at $M_0$ are well known in the art which are smooth on one side and have a plurality of elongated, parallel and adjacent lens elements each having the form of a semicylindrical cross section. Each semi-cylinder is of uniform width, in cross section, and narrow, usually in the order of 0.1 to 1 mm. Accordingly, when viewing the lenticular screen in cross section the boundary lines of adjacent lens elements correspond to opposite ends of each circular arc and when viewed from the face, define a plurality of stripes extending parallel to each other and transversely to the direction of movement of an optical aperture or opening $S_1$ which will be described in more detail. With such an optical system for exposure, the light rays coming from an objective to be photographed pass through, upon moving of the opening $S_1$ of the shutter $S_0$, the objective $L_0$ to the lenticular screen $M_0$ and then pass through the latter to the surface of the photosensitive material $F_0$. As a result the light rays are subjected to a refraction in both the objective $L_0$ and the lenticular screen $M_0$.

Consider now the way in which the image is formed for the object depicted at X and in particular the portion lying between points P and Q. The light rays coming from point P which are incident upon the objective $L_0$ are included within a beam $\theta_1$ covering the effective aperture of the objective $L_0$. The light rays coming from the point Q which are incident upon the objective $L_0$ are included within another beam $\theta_2$. Of the light rays included within these beams only that portion that passes through a particular lenticular element $M_2$ will be described for purposes of explanation.

To facilitate a better understanding of the invention it should be noted that only three enlarged elements $M_1$, $M_2$, $M_3$ are shown. However, it will be understood that there are actually a great many more lenticular elements and they are much smaller in scale, all serially arranged and assembled to form a trivision image. The light rays coming from points P and Q and centrally passing through the objective $L_0$ form the corresponding images at points $P_2$ and $Q_2$ at the surface of the photosensitive material $F_0$. This projection is indicated by solid lines. Of the beam $\theta_1$ coming from the point P, the light rays which are incident not upon the lenticular element $M_2$ but upon the lenticular element $M_1$, adjacent to such lenticular element $M_2$, are refracted in passing through the element $M_1$ and form the image of point P at point $P_1$ on the surface of the photosensitive material $F_0$. The light rays of the beam $\theta_2$ coming from the point Q that are incident not upon the lenticular element $M_2$ but upon the lenticular element $M_3$, adjacent to the lenticular element $M_2$, are refracted in passing through the element $M_3$ and form the image of the point Q at point $Q_3$ on the photosensitive material $F_0$. It is to be emphasized that only three lenticular elements $M_1$, $M_2$, and $M_3$ are shown in FIG. 20 on an enlarged scale for convenience of illustration and that these light rays actually pass through a succession of other lenticular elements arranged symmetrically about the lenticular element $M_2$ to form the projected image of that portion including the projected images of points P and Q, a projected image being formed by each element.

Directly viewable trivision of a plurality of projected images of the points P and Q formed by a plurality of lenticular elements is well known. However, the projected image thus formed in each lenticular element is a reversed image which cannot be directly viewed as the desired trivisional image. This will be better understood from the following discussion using the image formed by lenticular element $M_2$ by way of example. Images of the surfaces B, B− and B+ of the trivisional object $B_0$, to be photographed, which lie between the points P and Q, are formed in the reverse order B′+, B′, and B′− on the surface of the photosensitive material $F_0$. As a result the image of the surface B+ is formed near the image point $Q_2$ and the image of the surface B− is formed near the image point $P_2$. Similar reversal is found with respect to the object $A_0$ lying between the points L and P whose image is formed in the adjacent lenticular element $M_1$, and with respect to the object $C_0$ lying between the points Q and R, whose image is formed in the oppositely adjacent lenticular element $M_3$.

Since the image formation on the surface of the photosensitive material corresponds to the arrangement of surfaces of the object itself, which is being photographed, it might be erroneously assumed that the projected image can be trivisionally viewed. However, when the projected image is viewed through a lenticular screen, the image can not be viewed as a trivisional image. This is true because, when viewed through a lenticular screen, the left side surface B− of the object $B_0$ to be photographed is formed as a left image B′−, and the right side surface B+ of the object $B_0$ is formed as the right image B′+. As a result, the left image B′− is opposed through the semicylindrical lenticular lenses to the right eye, and the right image B′+ is similarly opposed to the left eye of the person who is viewing the projected images. As a result the right eye views an enlarged image corresponding to the left image B′−, and the left eye views an enlarged image corresponding to the right image B′+, respectively, when viewed through the lenticular screen. A similar relationship exists with respect to the objects $B_0$ and $C_0$.

To eliminate this phenomena and to obtain a normal trivisional image which is not reversed in the manner discussed above, it is known to move the lenticular screen $M_0$ the width of one of the lenticular elements, called one pitch, synchronously with and in the same direction of movement with the opening $S_1$ while holding the surface of the photosensitive material $F_0$ fixed relative to the surfaces of the photosensitive material $F_0$. As a result, the images of the surfaces $A-$, $A$, $A+$ of the object $A_0$ between the points L and P are viewed in the order $A'-$, $A'$, and $A'+$ as opposed to the above mentioned reverse order $A'+$, $A'$, and $A'-$ depicted in FIG. 20. Similar comments apply with respect to the objects $B_0$ and $C_0$. As a result the surface of the photosensitive material $F_0$ after printing provides a photograph that can be viewed as a normal trivisional photograph when viewed through a lenticular screen $M_0$ having lenticular elements of the same pitch as the screen with which the exposure was made.

Thus according to the present invention it is possible to easily obtain a normal trivisional photograph simply by making a single exposure from a single direction.

Figure 21:
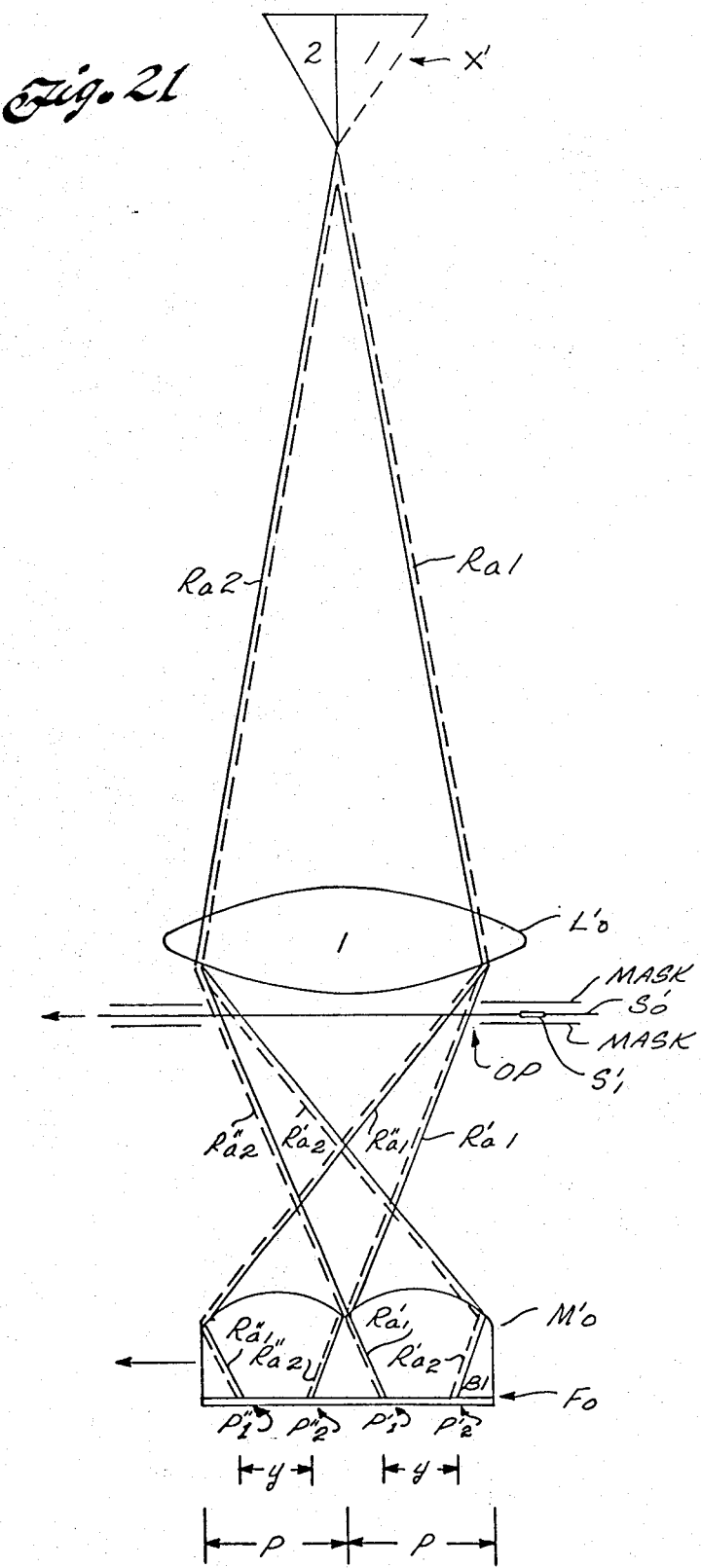
FIG. 21 is a schematic representation of the optical system and the way in which it changes, by a predetermined distance Y, on the surface of the photosensitive material, the position of light rays which come from a common point on the scene and which extend along the opposing sides of the optical path at the position where the shutter screen sequentially opens the path to light rays from the scene.

Having considered the general theory of obtaining the three dimensional photograph, the principles according to which the present invention is constructed should be considered. FIG. 21 is a simplified schematic illustration of a camera for taking three dimensional photographs and embodying the present invention and illustrates the deficiency in the photographic camera disclosed in the above mentioned Japanese patent application where the lenticular screen is moved only by the width of one lenticular element. FIG. 21 depicts a plan view of a three dimensional object $X'$, a camera including an objective lens $L'0$, a shutter curtain $S'0$ with aperture $S'1$, a pair of masks (MASK) having a rectangular shaped opening OP, one mask being positioned on each side of the shutter curtain $S'0$, and a lenticular screen $M'0$ having elongated semicircular spherical elements facing the shutter curtain $S'0$, the opposite side of the lenticular screen $M'0$ being positioned in intimate contact with the exposure surface of unexposed photosensitive material F0. It will be understood that, for illustrative purposes, the lenticular screen $M'0$ is shown greatly enlarged from actual dimensions and only two lenticular elements are shown whereas there are actually many more. Each lenticular element has a pitch or width P along the entire length thereof.

Assume that a light beam Ra1 is transmitted from the apex of the object $X'$. As indicated, the right hand side has light rays from the dashed line portion 1 of $X'$ whereas the left hand side has light rays from the solid line portion 2 of $X'$. Considering the right hand lenticular element and ignoring the change in angle as the light beam Ra1 enters the objective $L'0$, the light beam can be considered as having a portion $R'a1$ passing from the objective $L'0$ to the lenticular screen $M'0$ and striking the surface of the photosensitive material F0 at $P'1$. Note however that the light beam Ra2 passing from the apex of $X'$ to the left hand side of the objective $L'0$ can be considered as having a portion $R'a2$ leaving the objective lens $L'0$, striking the surface of the lenticular lens $M'0$ and striking the surface of the photosensitive material F0 at $P'2$. The distance Y between $P'1$ and $P'2$ represents the displacement of the light rays, traveling in beam Ra1 and Ra2, due to the characteristics of the optical system including the objective lens $L'0$ and the lenticular screen $M'0$. Similar displacement of the light rays will be seen with respect to $R''a1$ and $R''a2$ under the left hand lenticular element.

It should now be apparent that if the lenticular element $M'0$ is only moved by the distance of one pitch, during the time that the aperture $S'1$ moves from one side of the path for the light rays to the other, there will be a blank unexposed area because of the change in the optical rays due to the optical system. The present invention eliminates that blank space and a true unreversed three dimensional photograph is directly obtained, when viewed through a lenticular screen, by moving the lenticular screen not only the distance P but an additional distance substantially equal to the distance Y which is equal to the amount by which the optical system changes the position of the light rays on the surface of the photosensitive material, which light rays come from a common point on the scene and extend along opposite sides of the path created by the optical system.

With the general principles of the disclosed embodiment of the invention in mind, consider now a specific camera for taking three dimensional photographs and embodying a preferred form of the invention depicted in FIG. 2–18.

Figure 2:
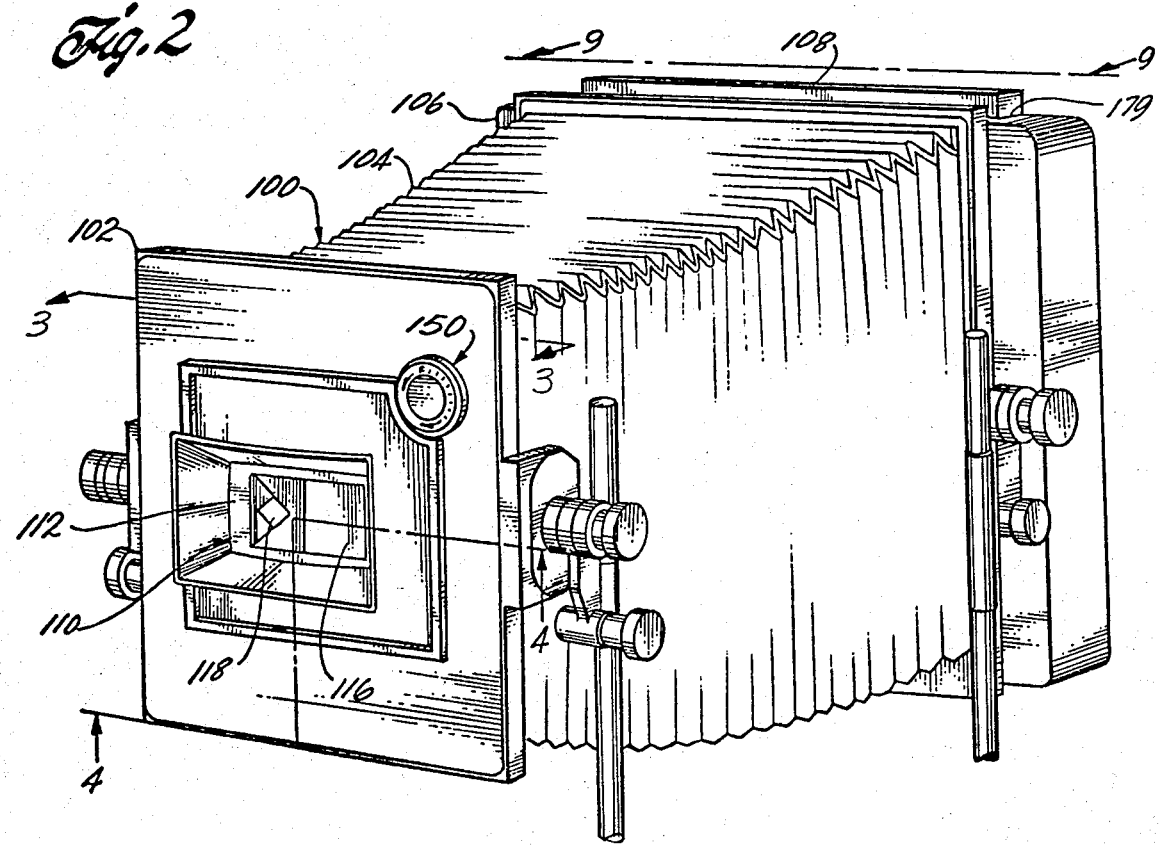
FIG. 2 is a pictorial view of a specific camera for taking three dimensional photographs and embodying the present invention.

Referring to FIG. 2, a camera for taking three dimensional photographs is disclosed having a housing 100 which is closed except for an opening 110. Although not essential to the present invention, the housing 100 is constructed in modular units in order to allow changeability of parts, changing of film and ease of construction. By way of illustrative example the housing 100 has a front unit 102, a bellows 104, a rear unit 106 and a film holder 108. The holder 108 is considered herein as part of the housing because it holds the film during exposure but it is actually removable and may be supplied separate from the housing 100.

Referring specifically to FIGS. 2–7, the front unit 102 includes an opening 110 to the housing interior for receiving light rays from a scene. Masks 112 and 114 having concentric rectangular openings are positioned on each side of a shutter curtain 116. The masks 112 and 114 together with their center apertures define the boundaries of the scene to be photographed and block light rays from passing around their apertures. In addition the masks 112 and 114 cooperate with the shutter curtain 116 to completely block any light rays from passing farther along the optical path to the photosensitive material until permitted by an aperture 118 in the shutter curtain 116 during exposure time.

The shutter curtain 116 contains aperture 118 which is carried by the shutter curtain. The shutter curtain 116 is movable, from a position wherein the aperture 118 is completely blocked by the masks 112 and 114, across the rectangular opening provided in masks 112 and 114 to a position where it is again completely blocked by masks 112 and 114 and when blocked prevents light rays from passing on along the light path to the photosensitive material. Movement of the aperture 118, during exposure time, is from left to right as depicted in FIG. 2 (from right to left as depicted from the rear in FIG. 3).

The shutter curtain motive mechanism is well known in the camera art and need not be explained in detail. However, it should be noted that the shutter curtain 116 includes, for the right side of FIG. 3, a center curtain part 120 wound on a spring loaded takeup reel 122 (FIGS. 3 and 5) and, connected to the center part 120, outer shutter curtain parts 124 and 126 wound on outer drive reels 128 and 130 (FIGS. 3 and 7).

Figure 3:
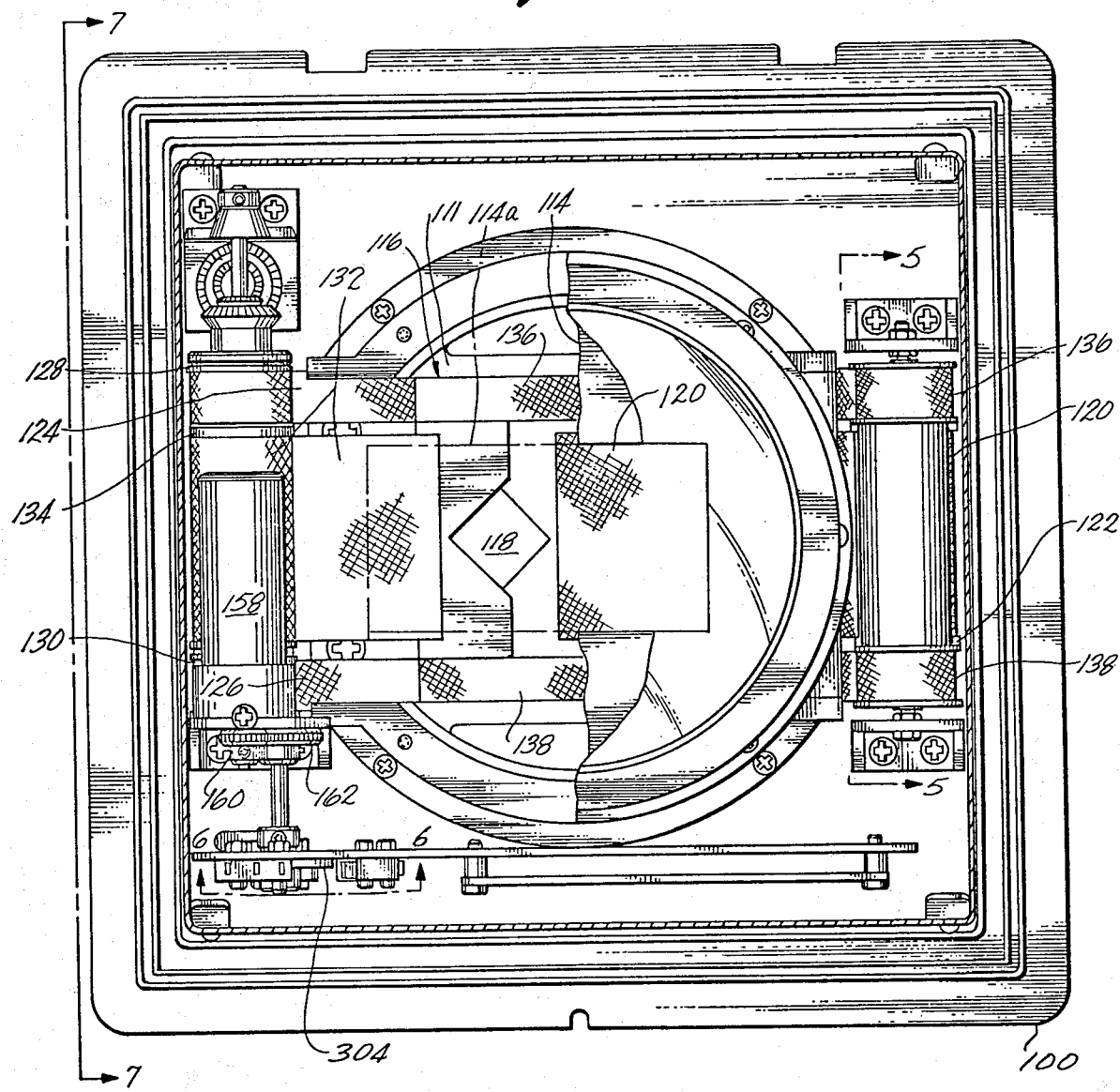
FIG. 3 is a cross-sectional view of the camera of FIG. 2 taken at the rear of the front unit along lines 3—3 of FIG. 2; the rear lenses, the holders for the rear lenses and the rearmost masks have been broken away to reveal the construction of the shutter curtain.
Figure 5:
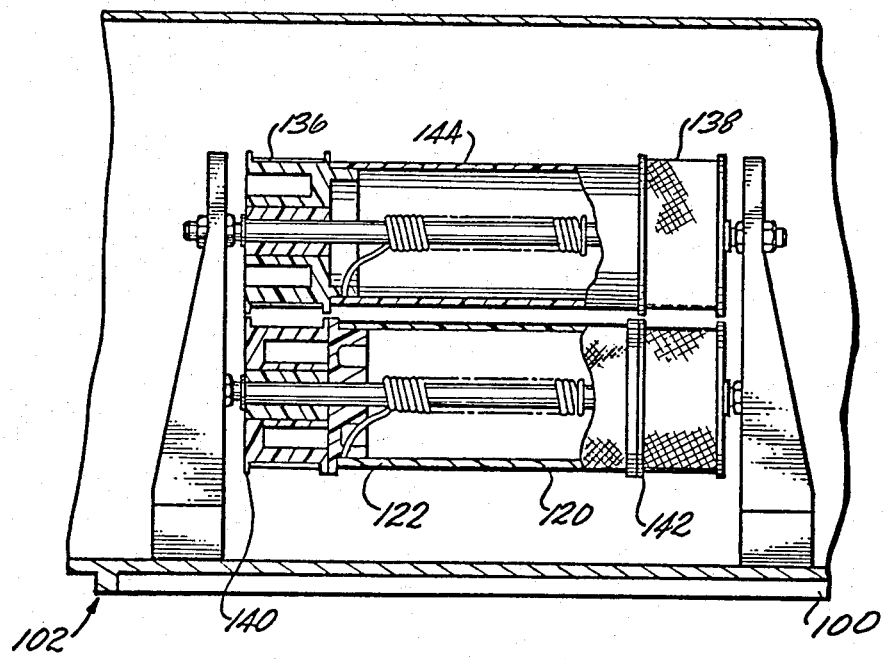
FIG. 5 is a side view of the takeup reels taken along lines 5—5 of FIG. 3; the takeup reels are shown partly in cross-section to reveal the spring return mechanism.

The shutter curtain 116 includes, for the left hand side of FIG. 3, a center shutter part 132 wound on the center drive reel 134 (FIGS. 3 and 7) and, connected to the center part 132, outer shutter parts 136 and 138 passing around, respectively, lower takeup reels 140 and 142, and wound around and connected to an upper takeup reel 144. The reels 122 and 144 are spring loaded as generally depicted in FIG. 5 so as to draw the shutter curtain taut towards the left hand side of the camera as depicted in FIG. 1 (the right hand side as depicted in FIG. 3).

Figure 7:
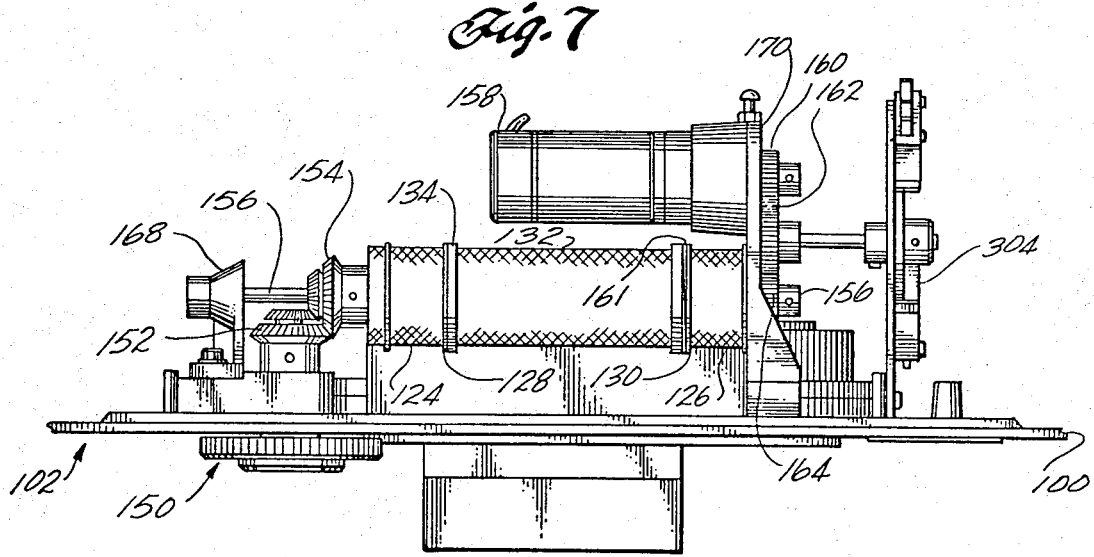
FIG. 7 is a side elevation view showing the shutter curtain drive reels, the F adjustment mechanism and the screen drive motor and the cams of FIG. 6 with the portions on the other side thereof removed for clarity.

Referring specifically to FIGS. 3 and 7, the drive reels 128, 130 and 134 are rotatably coupled on a shaft 156 which in turn is rotatably mounted in bearings (not shown) in supports 168 and 170 mounted on the front face of the housing 100. A D.C. electric motor 158 has its armature coupled to the shaft 156 through gear 160, intermediary gear 162, and gear 164, the gear 160 being connected to the armature shaft and the gear 164 being connected to shaft 156. Energization of the motor 158 causes the gear 160 and hence the shaft 156 to rotate which in turn rotates the drive reels 128, 130 and 134. Thus the motor 158 is part of the means for driving the shutter curtain 116 from side to side in the manner to be explained in more detail hereinafter.

The size of the aperture 118 is adjustable from an F setting knob 150. The knob 150 is coupled to a bevel gear 152 which in turn is coupled to bevel gear 154. The bevel gear 154 in turn is rigidly connected to drive reel 134. As a result, rotation of knob 150 rotates the drive reel 134 which in turn causes the center portion 132 of the shutter curtain 116 to move either to the right or to the left as seen in FIG. 3, depending on the direction in which the knob 150 is turned. Obviously, movement of the center portion 132 to the left will cause the aperture 118 to enlarge and pass more light, whereas movement to the right causes the aperture 118 to become smaller and thus allow less light.

Adjustment of the F setting and hence the size of the aperture 118 by rotation of the drive reel 134 is effected without changing the position of the drive reels 128 and 130 and hence the position of the outer parts 124 and 126 of the shutter curtain. To this end the bevel gear 154 and connected drive reels 128 and 130 are freely rotatable about the shaft 156 whereas the drive reel 134 is rigidly connected for rotation to the shaft 156. Rotation of the knob 150 and hence the drive reel 134 causes a slippage between the reels 130 and 134 through a ring spring 161 therebetween when the takeup reels 128 and 126 are held in position by the unenergized motor 158. When the motor 158 rotates, causing the gears 160, 162 and 164 and hence the drive reel 134 to rotate, the spring 161, due to friction between the reels 134 and 130, drives the reels 130 and 128 together with the reel 134, thus advancing the aperture from one side to the other, depending on the direction in which the motor 158 is turning.

Figure 4:
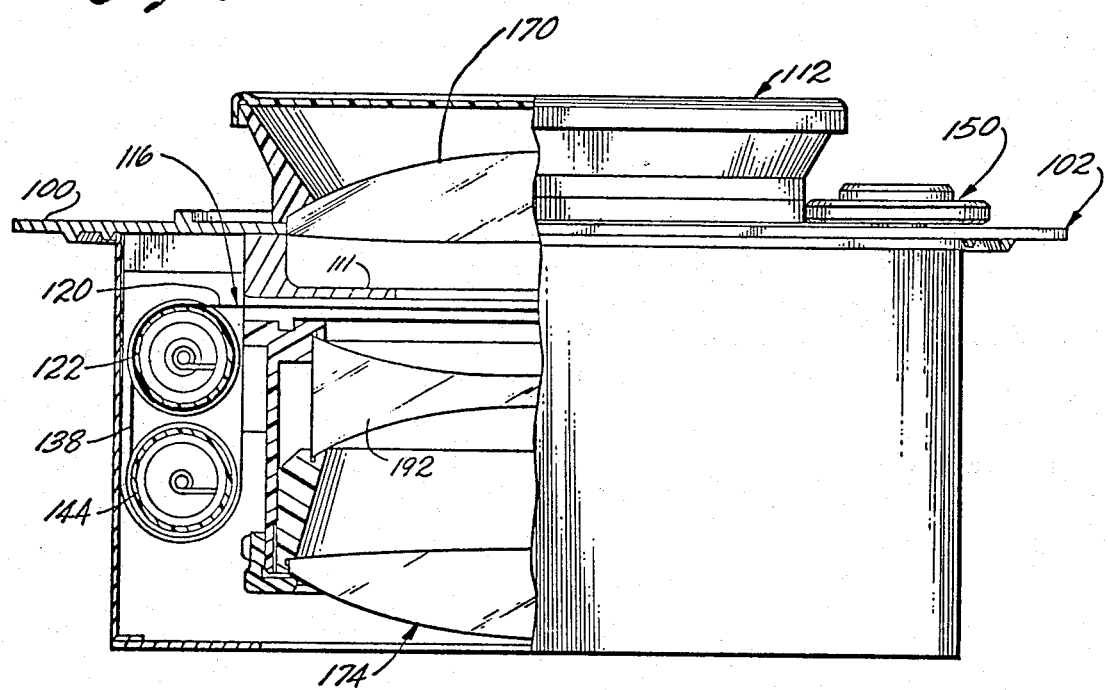
FIG. 4 is partly a bottom elevation view, partly in cross-section, of the front unit of the camera depicted in FIG. 2 taken along the lines 4—4 of FIG. 1.

Referring specifically to FIG. 4, the optical system includes an objective lens 170 positioned on the opening 110 side of the shutter curtain 116 and lenses 172 and 174 positioned on the opposite side of the shutter curtain 116. To provide the optimum three dimensional pictures with the amount of lenticular screen movement used herein it is desirable that the objective lens 170 be of large diameter, preferably 11 c.m. and the horizontal opening through the masks in 8 c.m. More generally the diameters of the lenses 170, 172 and 174 are desirably all greater than the dimensions of the mask opening and greater than the distance between the human eyes. The lenses 170, 172 and 174 form a composite 3 mm standard lens system which provides natural color balance and minimizes distortion.

Figure 9:
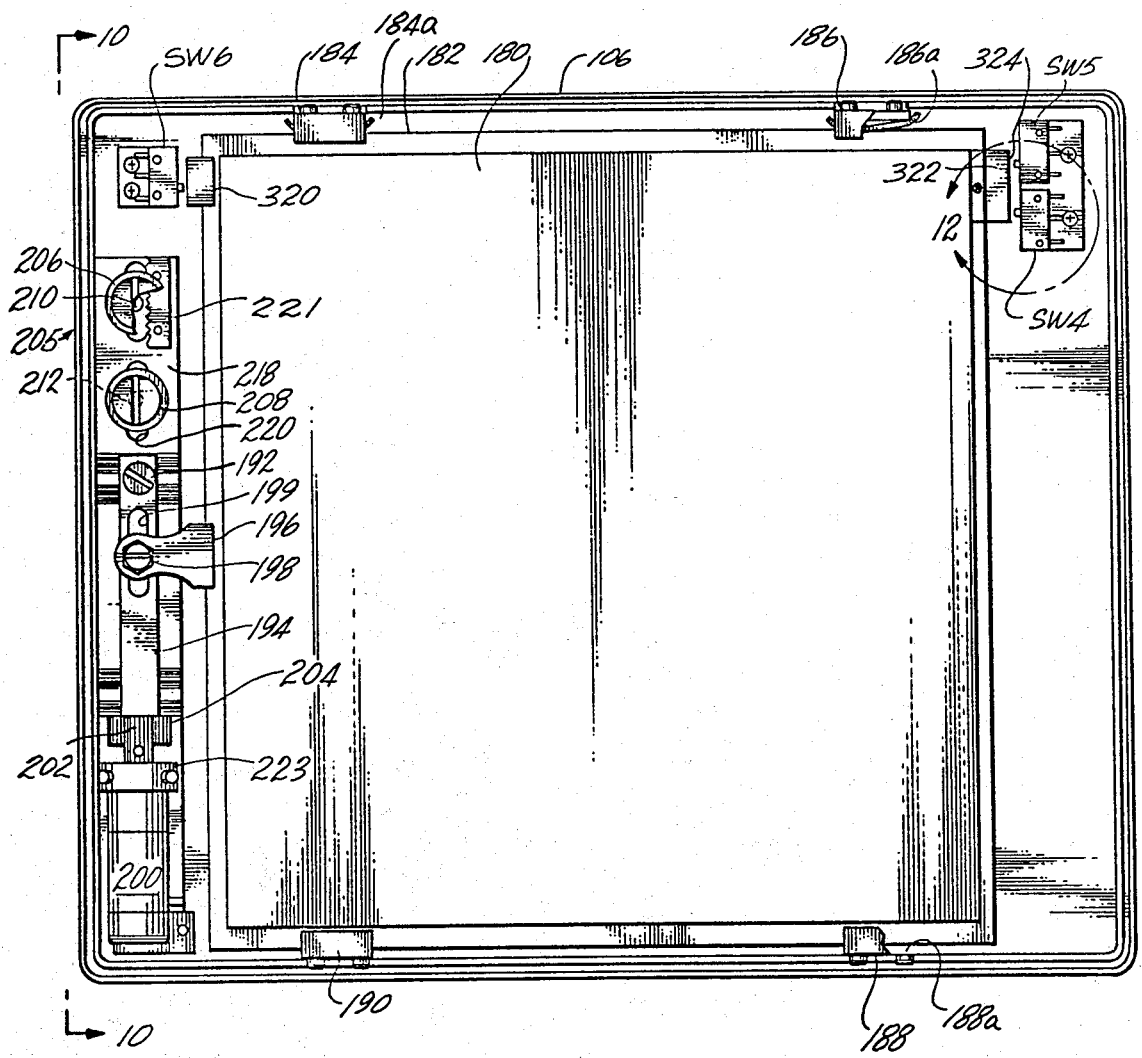
FIG. 9 is a section view of the rear unit taken along lines 9—9 of FIG. 2.

Refer now to the rear unit 106 where the lenticular lens and moving mechanism therefor are located. As generally indicated in FIG. 2, preferably a film holder 108 is slid into slots 179 provided on the upper side of the rear unit 106. Referring to FIGS. 9 and 10, a lenticular screen 180 is affixed to a clear support and backing such as the sheet of glass 182. Though not essential to the present invention, the lenticular screen 180 is affixed by cement or other well known bonding means, only at the top and bottom as depicted in FIG. 9, to the glass 182. Though not essential to the present invention, both the lenticular screen 180 and the glass 182 are substantially square with the glass 182 slightly larger than the lenticular screen 180. To be explained in more detail, the unexposed photosensitive material is held tightly against the outwardly facing surface of the lenticular screen 180, depicted in FIG. 9, during the exposure time.

The lenticular screen 180 is lenticulated at the interface between the lenticular screen 180 and the glass 182. The lenticulations on the lenticular screen 180 are preferably semicircular, parallel and elongated from top to bottom as seen in FIG. 9. The distance between adjacent junctions of the lenticular elements and the diameter of each lenticular element are the same and for purposes of explanation are referred to herein as "P".

The lenticular screen 180 must be precisely moved in a direction between the right and left hand sides of FIG. 9. It is of utmost importance that the movement of the lenticular screen 180 be precisely controlled in order for a complete, accurate and good quality three dimensional photograph to be obtained. To this end, guide means in the form of "U" shaped guides 184, 186, 188 and 190 guide the glass 182 in a straight line normal to the elongations of the lenticulations on the lenticular screen 180. Guides 186 and 188 are partially broken away to reveal the interior. The guides 188 and 190 are indentical, have a flat smooth bearing surface such as depicted at 188a for guide 188, and have legs extending on opposite sides of the glass 182 so as to cause the glass 182 to slide, when moved, smoothly and in a straight line in a sideways direction as seen in FIG. 9. The upper guides 184 and 186 are identical to each other and have leaf spring elements 184a and 186a which engage the upper edge of glass 182 and urge the glass towards the flat surfaces in the guides 190 and 188. All of the guides 184 – 190 are generally U-shaped to extend on opposite sides of the glass 182 to prevent the glass from moving in a direction perpendicular to the plane of FIG. 9.

Figure 8:
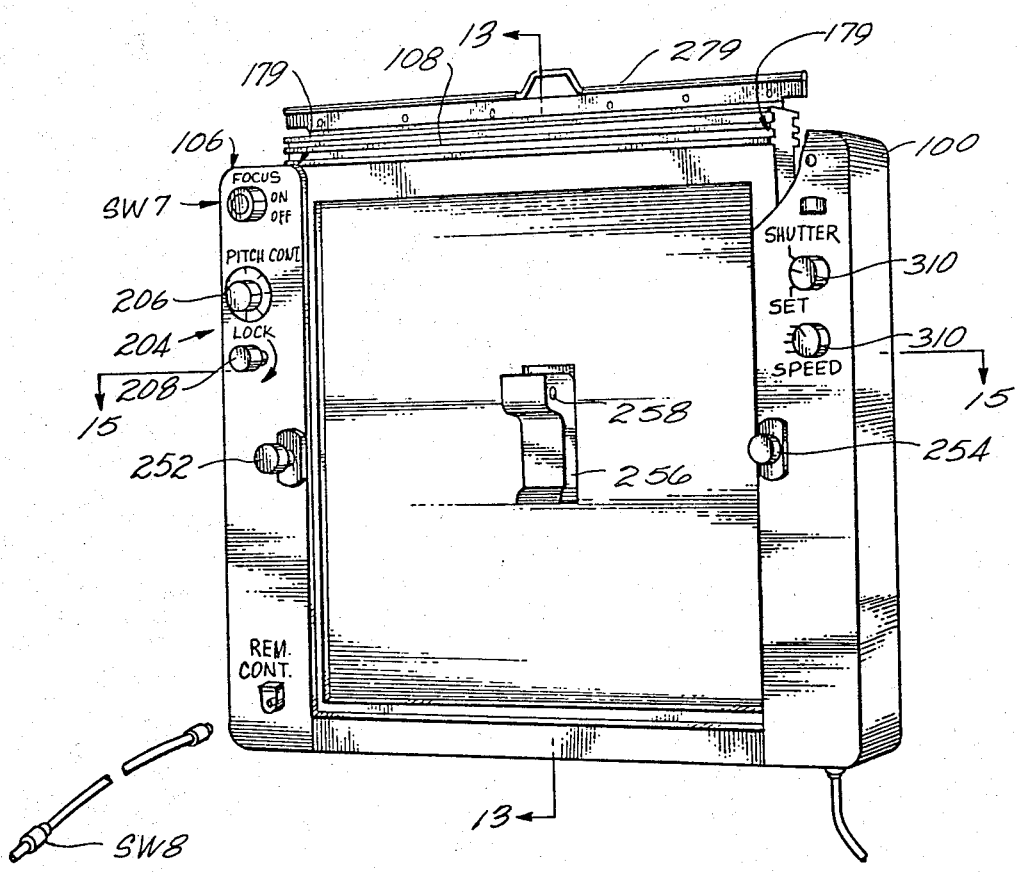
FIG. 8 is a rear pictorial view of the rear unit of the camera of FIG. 2.

A link 196 is connected between a pivotally mounted member 194 and the glass 182. A bolt 198 is affixed to the link 196 and extends into an elongated slot 199 in the pivoted member 194. With this arrangement the pivoted member 194 is free to rotate about the bolt 198 and to slide along its elongation relative to the bolt 198 for the reasons to be described in more detail hereinafter. A motor 200 together with a pinion gear 202 and a rack 204 form a motive means for pivotally moving the pivoted member 194 about its pivot and as a result for moving the glass 182 and the lenticular screen 180. Referring to FIGS. 8 and 9, means 205 is provided for relatively adjusting the distance between the pivot provided by bolt 198 and the connection, provided by link 196. This construction allows the amount of movement of the lenticular screen 180 to be precisely controlled during exposure time as will be described in more detail hereinafter.

Specifically, pitch control and lock knobs 206 and 208 are connected to shafts 210 and 212. The shaft 212 has a ring shaped collar 216 affixed in an axial direction thereto and an end 214 threaded into the housing 100 at rear unit 106 of the housing. In between the housing and the lock collar 216 and included in the adjusting means 205 is an elongated member 218 which slides vertically as seen in FIG. 9 and left and right as seen in FIG. 10. The elongated member 218 carries the pivot bolt 192, the pivoted member 194, motor 200, rack 204 and pinion 202. In addition the elongated member 218 has an elongated slot 220 through which the shaft 212 freely extends. Rotation of the knob in one direction causes the collar 216 to clamp the elongated member 218 against the housing 100, whereas rotation in the other direction removes the clamp, allowing the member 218 to be moved and thereby change the position of the pivot at 198 (for the lenticular screen) relative to the pivot at 192 (for the pivoted member 194).

The pitch control knob 206 and the shaft 210 cooperate with a rack 221 to allow controlled and accurate adjustment in the position of member 218. To this end the shaft 210 has threads extending lengthwise which in turn mate with the teeth in the rack 221. The lower end of the shaft 210 as seen in FIG. 10 is rotatably mounted in the rear unit 106 of the housing by means not shown. The motor 200 is affixed by means of a bracket 223 to the elongated member 218 and hence is carried with movement of the member 218.

The pinion 202 is connected to the armature of the motor 200 and mates with rack 224 pivotally mounted on the adjacent end of the pivoted member 194. The pivot is provided by a bolt 228 extending through the pivoted member 194 and significantly allows the rack 224 to maintain its teeth oriented parallel with the teeth in the pinion 202 as the motor moves the rack 224 from side to side. FIG. 9 depicts the pivoted member 194 in substantial alignment with the pinion 202 whereas FIG. 11 shows the pivoted member 194 pivoted to the right. In both cases the teeth in the rack 224 and in the pinion 202 remain aligned. This construction is important in causing smooth continuous and accurate movement of the lenticular screen by the motor 200.

Referring to FIGS. 8, 13, 14 and 15 the film holder 108 is slid into U-shaped slots at 179 provided on each side of the rear unit 106 which form means for permanently locating photosensitive material during exposure time. Referring to FIGS. 13 and 14, the film holder 108 has a rear surface 252 having a shaft 254 extending normal therethrough which in turn has a handle 256 rotatably mounted on a pin 258 extending through the shaft 254 at right angles thereto. The shaft 254 has a ring at the interior of the film holder 108 which fits in a cavity forming a part of the rear surface of a pressure plate 262. With this construction it will be seen that movement of the shaft 254 to the left as seen in FIG. 13 draws pressure plate 262 inward with respect to the holder, whereas movement of the shaft 254 to the right causes the pressure plate 262 to move outward. When the handle 256 is in the down position depicted in FIG. 13, a pair of pins (only one being shown) 264 extending in opposing directions from the handle 256 engage a landing 268 mounted on the rear surface 252, forcing the shaft 254 to its full position to the left. Rotation of the handle 256 to the outward position shown in phantom line in FIG. 13 moves the shaft 254 away from the landing 268 allowing the shaft 254 and hence the pressure plate 262 to move outward to the right.

A center coil compression spring 270 between the pressure plate 262 and the rear surface 252 urges them apart. Four coil compression springs 272, 274, 276 and 278 together with spring 270 apply a uniform pressure over the entire pressure plate 262, tending to move it to the right as depicted in FIG. 13.

As depicted in FIG. 14, the springs 272, 274, 276 and 278 are symmetrically positioned about the center spring 270 so that uniform pressure is applied by the pressure plate 262 when the handle 256 is rotated outward.

Referring to FIG. 8, lock bolts 252 and 254 are threaded through the housing 100 of the rear unit 106 and when tightened inward engage and hold the film holder 108 fixed in the rear unit 106. The nuts 252 and 254 are loosened to allow removal of the film holder from the slots 179.

Refer now to FIG. 15. FIG. 15 shows a cross-sectional view of the film holder 108 positioned adjacent the lenticular screen 180. Positioned between the lenticular screen 180, as may be more clearly seen in the enlarged cross-sectional view of FIGS. 16 and 17, is a sheet of unexposed photosensitive material 280. The handle 256 of the film holder 108 is in the outward position allowing the springs to uniformly load the pressure plate 262 against the sheet of photosensitive material 280 thereby sandwiching it tightly between the pressure plate 262 and the lenticular screen 180.

The photosensitive material may be attached to the surface of the pressure plate 262 seen in FIG. 14 in any one of a number of ways well known in the camera art. The lines on the pressure plate 262 depicted in FIG. 14 may be used for aligning the film so that it is symmetrically positioned with respect to the center of the pressure plate 262. Preferably the photosensitive material 280 is attached to the pressure plate 262 by double backed adhesive positioned along the upper side of the photosensitive material 280, although other means for attachment may be used. To be explained in more detail, the lenticular screen 180 is moved with the glass 182 to the left as depicted in FIG. 15. Friction between the lenticular screen 180 and the photosensitive material 280 may tend to cause the pressure plate 262 to move with the lenticular screen to the left, preventing a complete movement of the lenticular screen 180 relative to the photosensitive material 280 during the limited exposure time. Accordingly stops 290 and 292 (FIGS. 14 and 15) are provided along the side of the housing for the film holder 108 and engage the pressure plate 262. Such engagement is ensured by a side loading spring 282 (FIG. 15). As a result the pressure plate 262 is restrained against side movement when the lenticular screen 180 is moved to the right as seen from the front (to the left in FIGS. 9, 14 and 15) relative to the photosensitive material during exposure time.

Figure 6:
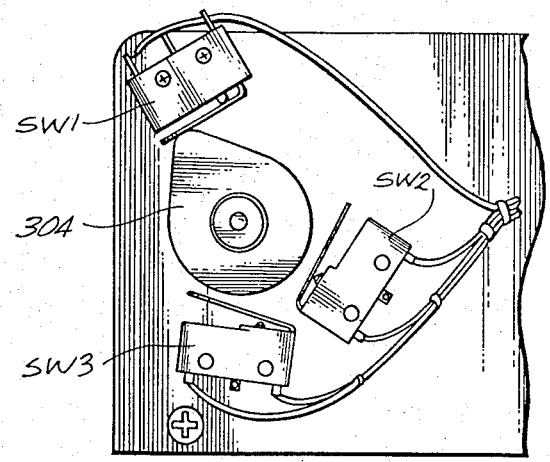
FIG. 6 is a plan view of a portion of the housing and the screen start, stop and center position switches, taken along lines 6—6 of FIG. 3.
Figure 18:
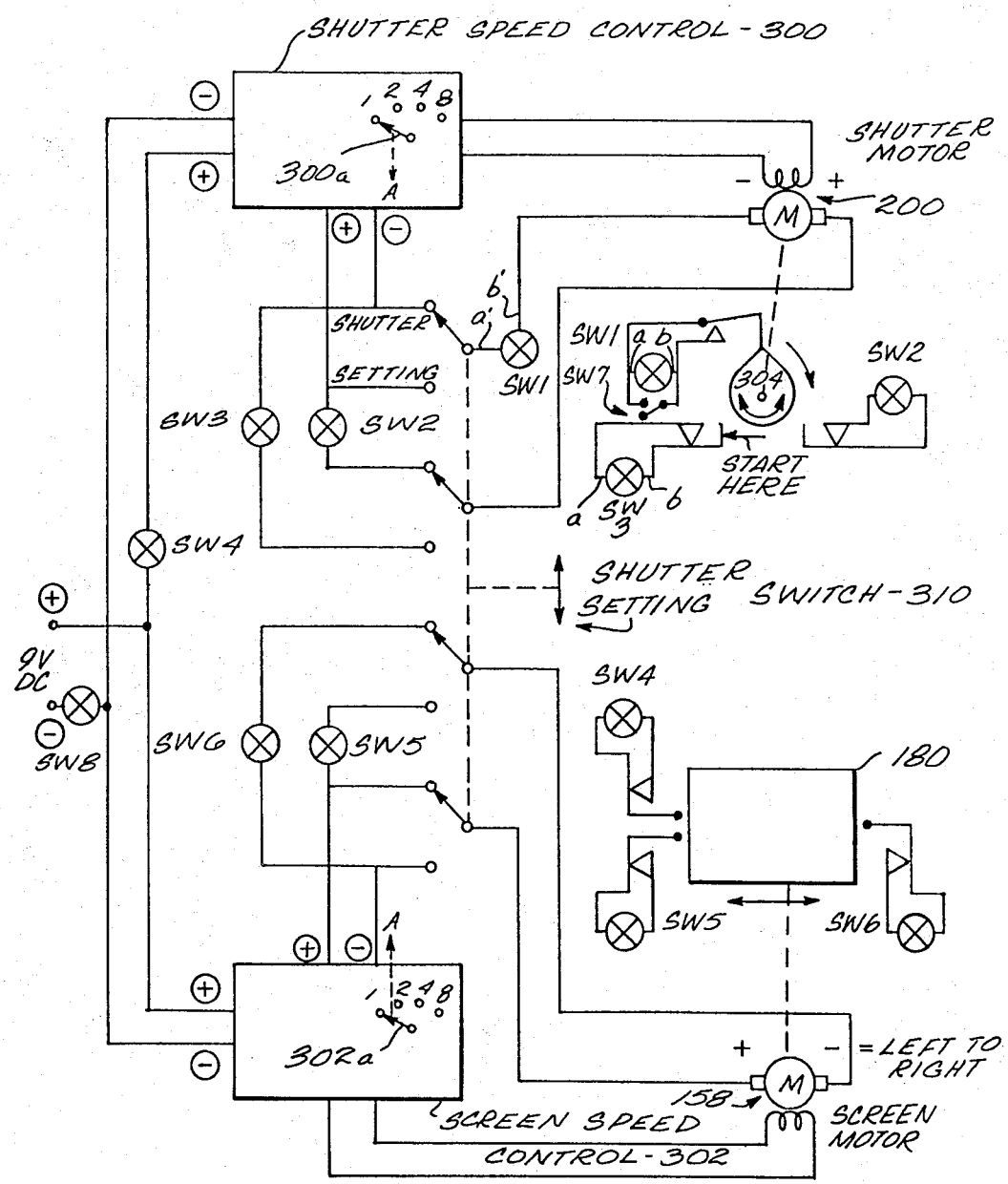
FIG. 18 is a schematic representation of the electrical control system for the shutter motor and the screen motor.

Before considering the operation of the camera with respect to the schematic diagram of FIG. 18, consider the various electrical sensing switches, stops, and cams. Referring to FIG. 6, cam 304, driven by the shutter curtain motor 158 which in turn actuates left stop switch SW3, right stop switch SW2 and center stop switch SW1 for the shutter curtain, the directions being given from the front of the camera as seen in FIG. 2 and the positions being in relation to the positions of the aperture of the shutter screen. Referring to FIG. 9, stops 320 and 322 are mounted on the glass 182 for actuating lenticular screen switches. Specifically, stop 322 actuates left stop switch SW5, delay switch SW4 and stop 320 actuate right stop switch SW6, all directions being given with respect to the front of the camera in FIG. 2 and all being with respect to the position of the lenticular screen 180 (or glass 182).

Referring to FIG. 18, the motors 158 and 200 are conventional D.C. motors each having armature and field windings. Conventional four speed shutter speed controls 300 and 302 control the electrical signal to the windings of motors 200 and 158, respectively. The controls 300a and 302a of the shutter speed controls 300 and 302 are connected together to speed control knob 310 on the rear unit 106 so that their settings are adjusted to cause the motors 200 and 158 to rotate at the proper speed determined by the setting of knob 310. The switches SW1 – SW6 are all conventional which when depressed by the corresponding stop electrically opens a set of contacts breaking electrical continuity therebetween. The contacts are depicted schematically in FIG. 18 and the corresponding position in the electrical circuit between which they are connected is depicted by a. For example, switch SW1 has sides "a" and "b" of its contacts connected between lines "a'" and "b'".

The cycles (FIG. 19) of operation of the camera are controlled by a focus switch SW7, a remote switch SW8, and a shutter set switch 310 on the rear unit 106 of the camera (FIG. 8). The remote switch SW8 with cord and connector plug into a remote connector receptacle shown in the rear unit 106.

Figure 19:
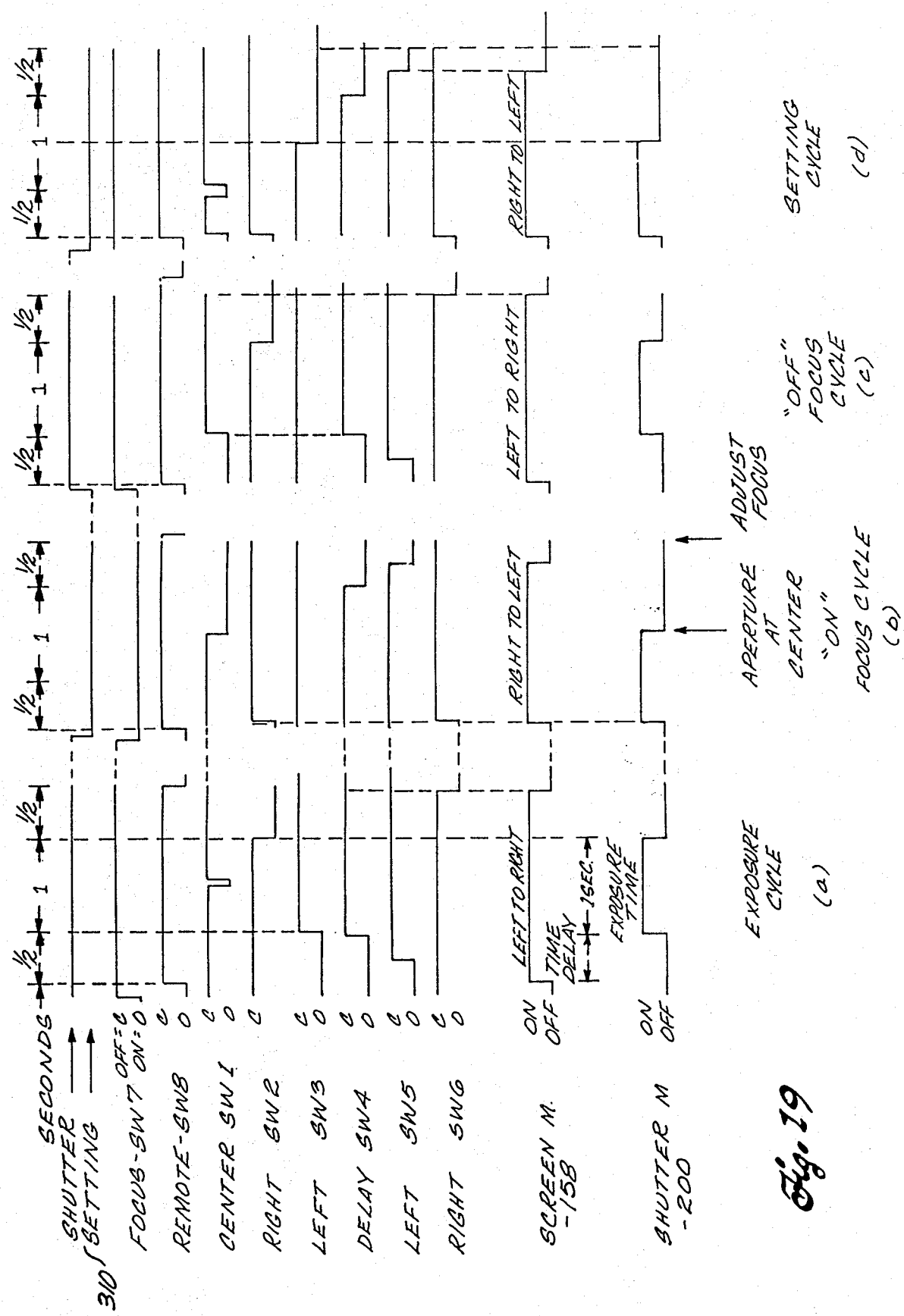
FIG. 19 is a timing diagram illustrating the sequence of operation of the electrical control system of FIG. 18.

Consider now the operation of the photographic camera according to the present invention, making reference to the schematic diagram of FIG. 18 and the timing diagram of FIG. 19. Assume that the shutter screen is positioned with the aperture 118 positioned on the left hand side of the front of the camera (FIG. 2) behind the mask 112 so that no light travels along the optical path to photosensitive material positioned on the pressure plate 262 of holder 108. Also assume that an exposure cycle is taking place as depicted at "a" in FIG. 19 where the focus switch SW7 is in the off position causing its contacts to be closed. With the shutter curtain and lenticular screen positioned fully to their left positions, left stop switches SW3 and SW5 and delay switch SW4 are actuated causing their contacts to be opened and right stop switches SW2 and SW6 are now deactuated and their contacts are closed. Assume that remote switch SW8 is actuated causing a 9 volt source of potential (not shown) to be applied along the conductors going to shutter speed control circuit 300 and screen speed control circuit 302. The screen speed control motor 302 in turn applies power through the closed contacts SW6 through the contacts of the shutter setting switch 310 to the armature of the motor 158 causing from left to right across motor 158 a + to − voltage and applying a control signal to the field of the motor 158. This causes the screen pitch control motor 158 to start driving the lenticular screen 180 towards the right hand side of the camera. However, since the delay switch SW4 is now actuated and its contacts are open, no power is applied to the shutter speed control 300. With the screen 180 moving, shortly the left end stop switch SW5 is deactuated but the motor 158 continues driving the screen towards the right. Subsequently the delay switch SW4 is deactuated, allowing its contacts to be closed, thereby closing the circuit between the 9 volt D.C. source of power and the shutter speed control 300 which in turn applies power to shutter motor 200, causing it to commence driving the shutter and aperture 118 towards the right.

It should be noted at this point that the lenticular screen 180 started moving prior to the commencement of movement of the shutter. The time period during which the screen moves prior to the commencement of movement of the shutter is depicted by "time delay" in "a" of FIG. 19 and is the time between the time the screen motor commences its operation and the time that the delay switch SW4 is dectuated, causing the shutter motor to start driving the shutter. Referring to FIG. 16 it is possible that the photosensitive material 280 may have wrinkles or bubbles which were not smoothed out merely by the pressure of the pressure plate 262. This is depicted by the exaggerated illustration of FIG. 16. By causing the above described preliminary movement of the screen and holding the pressure plate 262 fixed against the stops 290 and 292, the photosensitive material 280 is caused to smooth out because of the preliminary wiping action of the lenticular screen 180. The delay time before switch SW4 is deactuated allows sufficient movement of the screen relative to the pressure plate so that the photosensitive material is smoothed out into uniform contact with the screen prior to the exposure time.

Continuing with the operation, both the shutter motor 200 and the screen motor 158 continue to rotate and hence move the shutter curtain and the lenticular screen. As the cam 304 rotates it will briefly engage the actuator arm on the center stop switch SW1, opening and closing its contacts. However, the contacts of the center stop switch SW1 are not shorted through the closed contacts of the focus switch SW7 and hence power to the shutter motor 200 is not broken. The shutter continues moving towards the right as depicted in FIG. 2 until the cam 304 engages the actuator arm of the right stop switch SW2 at which time the circuit from the shutter speed control 300 to the armature of the shutter motor 200 is broken, stopping movement of the shutter motor and hence the shutter. However, the screen motor 158 is still being energized and hence continues to move the lenticular screen 180 towards the right until the right stop switch SW6 is actuated, opening its contacts. When the right stop switch SW6 is actuated and its contacts open, power is broken from the screen speed control circuit 302 to the screen motor 158, stopping its operation and hence movement of the screen.

For purposes of explanation it is assumed that the exposure cycle of FIG. 19a produces an exposure time of one second. Under these circumstances the shutter motor is energized for one second which in turn causes the aperture 118 in the shutter to allow light rays to pass to the photosensitive material for one second.

Assume now that it is desired to take another photograph and therefore the camera is to be refocussed and reset ready for another exposure cycle. Initially the sequence of operation depicted in "b" of FIG. 19 takes place. Specifically the focus switch SW7 is placed in an ON position causing its contacts to be open as depicted in FIG. 18. Additionally the switch 310 is set to a setting position and hence all of its contacts are in the lower position opposite to that depicted in FIG. 18. Also at this point in time both the shutter and the lenticular screen are at the right hand side of the camera as depicted in FIG. 2, causing the switches SW2, SW6 to be actuated and hence their contacts are open. Additionally the left stop switches SW3, SW5 and the delay switch SW4 are deactuated, causing their contacts to be closed. Assume now that the remote switch SW8 is actuated, causing power to be applied from the 9 volt source of power to the shutter speed control 300 and the screen speed control 302. The power applied to the armature of the motors 200 and 158 has now been reversed by virtue of the change in position of the switch 310 to the setting position. Hence the motors start driving the screen and shutter towards the left hand side of the camera as seen in FIG. 2. This operation continues until the shutter motor 200 rotates the cam 304 into engagement with the actuator arm of the center stop switch SW1 at which time its contacts are open. Since the focus switch SW7 is now in an ON position and its contacts are open, the broken contacts of switch SW1 break the power to the shutter motor 200, leaving the aperture 118 at the center of the opening 110 as seen in FIG. 2. However, power continues to be applied to the screen motor 158, driving it towards the left. Subsequently the delay switch SW4 is actuated but since the shutter motor 200 has already been stopped, it has no effect. The screen continues to move until the left stop switch SW5 is actuated, causing the contacts of SW5 to be open and thereby break power to the screen motor 158, stopping the movement of the screen motor and the screen.

With this position of the screen and the shutter it is now possible to loosen bolts 252 and 254, remove the film holder from the rear unit 106 of the camera and look through the camera and adjust the distance through the center bellows between the front unit 102 and the rear unit 106 in order to focus the camera for the next scene to be photographed. After focussing, the film holder 108, loaded with new unexposed photosensitive material and covered with shield 279, is returned to the slots 179 in the rear unit 106. After the film holder is inserted, the locking bolts 252 and 254 are tightened against the film holder and the shield 279 is removed, placing the photosensitive material on the film holder in the path for light rays through the camera. The handle 256 is then turned 90° from that depicted in FIG. 8 causing the pressure plate to move the photosensitive material tightly against the lenticular screen. Next, the off-focus cycle depicted at "c" in FIG. 9 takes place. During the off-focus cycle the shutter and lenticular screen are to be completely positioned to the right, preparatory for the last or setting cycle "d" where both are reset completely to the left, ready for a new exposure cycle.

Referring to the off-focus cycle at "c" of FIG. 19, the focus switch SW7 is positioned to the OFF position with its contacts closed (i.e., opposite to that depicted in FIG. 18). Additionally the switch 310 is set to the shutter position. Subsequently the remote switch SW8 is actuated, applying power to the screen speed control 302 which in turn applies power across the screen motor 158 (+ to − across the armature as depicted in FIG. 18), causing the motor 158 to start driving the screen to the right. However, the delay switch SW4 is initially actuated, hence no power is applied to the shutter speed control 300 and the shutter motor 200 remains deenergized. Subsequently the left stop switch SW5 is deactuated and later the delay switch SW4 is deactuated, closing their contacts and thereby connecting 9 volts D.C. to the shuter speed control 300, starting its operation. Similar to the screen motor 158, power is applied across the armature of the motor 200, + to − as depicted in FIG. 18, causing the shutter motor 200 to commence moving its shutter aperture from the center of the opening 110 to the right hand side. This operation continues until the right stop switch SW2 is actuated, opening its contacts and thereby breaking the power to the armature of the motor 200, stopping its operation. The screen motor 158 continues rotating until the right stop switch SW6 is actuated, causing its contacts to open and thereby break power to the screen motor 158.

At this point the setting cycle depicted at "d" in FIG. 19 is commenced. Initially both the screen and the shutter are positioned at the right and hence the right stop switches SW2 and SW6 are operated, causing their contacts to be open, whereas the left stop switches SW3 and SW5 and the delay switch SW4 are deactuated with their contacts closed. The switch 310 is set to the setting position where its wiper is at the lower position depicted in FIG. 18 and the focus switch SW7 is switched to the OFF position with its contacts closed (i.e., opposite to that depicted in FIG. 18). Subsequently the remote switch SW8 is actuated, connecting the 9 volt D.C. power to both the shutter speed control 300 and the screen speed control 302. This causes both of the motors to operate and drive the shutter to the left hand side with the aperture hidden behind the masks and drive the screen 180 to the left. Similar to that described above, the shutter motor 200 is shut off when the shutter aperture reaches its left hand extremity and the left stop switch SW3 is actuated, whereas the screen motor 158 is shut off when the screen reaches the left hand extremity, actuating the left stop switch SW5. Thus the camera is now ready for another exposure cycle.

As depicted in FIG. 9, stops 320 and 322 are provided for engaging, respectively, the switches SW6 and SW5, SW4. The stop 322 has a front edge 324 which engages the actuator arm of the left stop switch SW5. However, the stop 322 has a spring loaded plunger 326 for actuating the plunger or actuator arm 328 of the switch SW4. Because of the spring loaded plunger 326, the plunger 328 and hence switch SW4 is maintained in an actuated position for the initial time delay period required for the screen to smooth out the photosensitive material after operation of the screen motor 158 is commenced.

Consider now the construction for the rear unit of an alternate embodiment of the invention as depicted in FIGS. 22–27.

A rear frame 1026 of the rear unit is adapted to carry a film holder 10110. A film holder insertion frame 1081 is affixed by a metal frame 1080 which is of generally U-shape. A rectangular shaped lenticular screen 1083 is located in a plane opposed to that in which the film is inserted into the insertion frame 1081. The lenticular elements face away from the frame 1081. The film is inserted behind the rear frame 1026. Guide pieces 1084 and 1085 projecting from the upper and lower frames of the frame mechanism 1081 allow the screen 1083 to slide laterally. The screen 1083 is supported at a side edge 1083' by a plurality of holder pieces 1086 fixed longitudinally along one side so that the screen may be smoothly guided in a lateral direction a distance in the order of 5 mm or less, as will be described in more detail hereinafter. At the other edge 1083" of the screen 1083, there is provided a projection 1087 which has a pin 1088 affixed thereto.

The pin 1088 extends horizontally into a notch 1090 formed at the upper end of a link lever 1089. The link lever 1089 is supported by a pivot 1091. A pin 1094 which is affixed to the rack 1093 is inserted into a notch 1092 at the lower end of the link lever 1089. The rack 1093 has a pair of slits into which a pair of vertically extending supports 1095 extend. The supports 1095 are affixed on the bottom of the rear frame 1026. The supports 1095 are loosely inserted in the slots 1093' and are supported on the top ends by screws (see FIG. 24). The rack 1093 has a row of teeth 1096 which engage a pinion 1097. A shaft 1098 is affixed to the pinion 1097. The shaft 1098 is connected through pivoted joints 1099 and 10100 to a shaft 10102 connected to the input of a reduction mechanism 10101. A reversible motor 10101a is contained in the reduction mechanism 10101. The motor 10101a operates through reduction gearing (not shown) so as to rotate the shaft 10102 at a reduced velocity compared with the speed of the motor 10101a. The rotation of shaft 10102 is transmitted through the joints 10100 and 1099 through the shaft 1098 to rotate the pinion 1097 and thereby linearly move the rack 1093 with respect to supports 1095, 1095. The motor 10101a in the reduction unit 10101 is reversible and, depending on the direction of movement of the motor 10101a and hence of the rack 1093, the link lever 1089 has its upper end rotated to the right or the left, about the pivot 1091 through the pin 1094. The notch 1090 carried at the upper end of the lever 1089 carried the pin 1088 in its movement about the pivot 1091. The direction of movement of the upper end of the lever 1089 is opposite to that of the bottom end. The ratio at which the opposite ends of the link lever swing is determined by the distances of pins 1088 and 1094 with respect to the pivot 1091. Thus the pin 1088 can be arranged to move an extremely small extent compared with large movements of the pin 1094. As a result it is easy to control the ratio of relative movement by displacement of the pivot pin 1091 in a vertical direction.

As best seen in FIG. 22, displacement of the pivot pin 1091 in a vertical direction is achieved by threading the pivot pin 1091 into a movable member 10105 which is supported through a pair of screws 10104 by a pair of metal mountings 10103 affixed in turn onto the side of the insertion frame 1081. A movable member 10105 is guided between a pair of substantially parallel rails 10106. The vertical position of the pivot 1091 may be ajusted by adjusting the relative extent to which the pair of screws 10104 are threaded inwardly. With this arrangement the vertical displacement of shaft 1091 causes the distance between the shaft 1091 and the pin 1088 and the distance between the shaft 1091 and the pin 1094 to be relatively varied and thereby enable adjustment of the ratio of rotation of the pins 1094 and 1098. The adjustment allows adjustments for lenticular screens having pitches of 0.2 mm to 5.0 mm. Thus the screen 1083 may be moved to a smaller extent merely by displacing the shaft 1091 upward while the screen may be moved to a larger extent by displacing the shaft 1091 downward. Once the desired screen movement has been adjusted by proper positioning of the shaft 1091, the screen will always be moved by the same pitch corresponding to the screen being used and no further adjustment for the screen is required.

It should be noted that screens of different pitches may be exchanged and used and the corresponding adjustment is easily facilitated by the screws 10104 according to each screen, in accordance with the present invention.

The distance over which the diaphragm aperture of the camera moves across an objective of large diameter is, for example, 8 cm, while the distance over which the lenticular screen 1083 moves is 0.3 mm.

Although an exemplary embodiment of the invention has been disclosed for purposes of illustration, it will be understood that various changes, modifications and substitutions may be incorporated into such embodiment without departing from the spirit of the invention a defined by the claims appearing hereinafter.

What is claimed:

1. A photographic camera for three dimension photography comprising:
    a housing having an opening to the interior for light rays;
    means for immovably locating photosensitive material in communication with the interior of the housing at a location during a time for exposure;
    optical means in said housing for projecting light rays, which are received through said opening from a scene to be photographed, along an optical path to said location, said path having a first position therealong extending transversely to the direction of the path from a first side to a second side of the path, the optical means comprising
        a lenticular screen extending across said path at a second position farther along said path from the first position and having, on one side, a plurality of elongated lenticular elements of width P which face in the direction from which the light rays are being projected and having an opposite side facing and positioned for contact with the surface of such located photosensitive material,
        the optical means being characterized in that it changes, by a predetermined distance Y, on such surface of the photosensitive material, the position of light rays which come from a substantially common point on such scene and which extend along said first and second sides of said path;
    means for blocking the received light rays at said first position;
    an aperture movable transversely across said path at said first position, from said first side to said second side, for exposing said light rays sequentially to the photosensitive material moving across said screen in a direction normal to the elongation of said lenticular elements; and
    means for so moving said aperture for a predetermined time for exposure while simultaneously and synchronously moving said screen, substantially throughout said predetermined time for exposure, in substantially the same direction as the light rays sequentially expose said photosensitive material and over a distance substantially equal to the sum of P + Y to thereby expose a substantially continuous unreversed image of the scene on the photosensitive material, said means for moving comprising
        means for moving said lenticular screen a predetermined distance along a path transverse to the path of the light simultaneously with the movement of said optical aperture and comprising
            means for guiding said screen along said predetermined path,
            a pivoted member,
            means for connecting said pivoted member, at a position displaced from the pivot thereof, to said screen,
        a rack connected to said pivoted member,
        a pinion for engaging said rack, a motor connected for rotatably driving said pinion to thereby move said rack and thereby pivot the pivoted member and move said screen along said predetermined path a precise predetermined amount corresponding to the driving movement of said motor.

2. A photographic camera for three dimensional photography according to claim 1 comprising means for adjusting the distance between the connection of said pivoted member to said screen and the pivot of said pivoted member to thereby precisely adjust the amount of movement of said screen for a given rotational drive by said motor.

3. A photographic camera for three dimensional photography according to claim 2 wherein said means for adjusting comprises manually movable means for effecting such adjustment and manually operable means for locking said manually movable means to prevent movement during the exposure cycle.

4. A photographic camera according to claim 1 wherein said lenticular screen has substantially straight elongated semicircular lenticular elements and wherein said guiding means comprises means for guiding said screen along a substantially straight path at substantially right angles to the elongation of said lenticular elements.

5. A photographic camera according to claim 4 comprising a substantially rigid transparent backing member affixed to the lenticulated side of said screen for maintaining said screen in a substantially fixed planar condition and wherein said guide means engages and guides said backing member.

6. A photographic camera according to claim 5 wherein said means for connecting is connected to said backing member.

7. A photographic camera according to claim 1 wherein said rack is pivotally mounted with respect to said pivoted member to thereby maintain alignment with said pinion during pivoting of said pivoted member to thereby provide a uniform smooth movement of said screen.

8. A photographic camera for three dimensional photography comprising:
means for positioning photosensitive material at a fixed location during an exposure cycle of the camera;
optical means for projecting light from a scene to be photographed along an optical path onto said photosensitive material;
a lenticular screen positioned in such optical path and adjacent such location for photosensitive material;
means for blocking the path of light from such scene;
means for passing an optical aperture across said optical path for sequentially exposing the photosensitive material through said lenticular screen to the light rays from such scene;
means for moving said lenticular screen a predetermined distance along a path transverse to the path of the light simultaneously with the movement of said optical aperture and comprising
means for guiding said screen along said predetermined path,
a pivoted member,
means for connecting said pivoted member, at a position displaced from the pivot thereof, to said screen,
a rack connected to said pivoted member,
a pinion for engaging said rack,
a motor connected for rotatably driving said pinion to thereby move said rack and thereby pivot the pivoted member and move said screen along said predetermined path a precise predetermined amount corresponding to the driving movement of said motor.

9. A photographic camera for three dimensional photography according to claim 8 comprising means for adjusting the distance between the connection of said pivoted member to said screen and the pivot of said pivoted member to thereby precisely adjust the amount of movement of said screen for a given rotational drive by said motor.

10. A photographic camera for three dimensional photography according to claim 9 wherein said means for adjusting comprises manually movable means for effecting such adjustment and manually operable means for locking said manually movable means to prevent movement during the exposure cycle.

11. A photographic camera according to claim 8 wherein said lenticular screen has substantially straight elongated semicircular lenticular elements and wherein said guiding means comprises means for guiding said screen along a substantially straight path at substantially right angles to the elongation of said lenticular elements.

12. A photographic camera according to claim 1 comprising a substantially rigid transparent backing member affixed to the lenticulated side of said screen for maintaining said screen in a substantially fixed planar condition and wherein said guide means engages and guides said backing member.

13. A photographic camera according to claim 12 wherein said means for connecting is connected to said backing member.

14. A photographic camera according to claim 8 wherein said rack is pivotally mounted with respect to said pivoted member to thereby maintain alignment with said pinion during pivoting of said pivoted member to thereby provide a uniform smooth movement of said screen.

* * * * *

UNITED STATES PATENT AND TRADEMARK OFFICE
CERTIFICATE OF CORRECTION

PATENT NO. : 4,107,712

DATED : Aug. 15, 1978

INVENTOR(S) : Chi Y. Law

It is certified that error appears in the above-identified patent and that said Letters Patent are hereby corrected as shown below:

Col. 3, line 46 "anv" should be -- and --;
Col. 11, line 66 "in" should be -- is --;
Col. 15, line 18 insert -- normally closed micro switches having an actuator arm --;
Col. 15, line 24 "by a" should be -- by a Ⓢ --;
Col. 19, line 26 "carried" should be -- carries --;
Col. 22, line 41 "claim 1" should be -- claim 11 --.

Signed and Sealed this

Sixth Day of March 1979

[SEAL]

Attest:

RUTH C. MASON
Attesting Officer

DONALD W. BANNER
Commissioner of Patents and Trademarks